(12) United States Patent
Faulkner et al.

(10) Patent No.: US 8,995,977 B2
(45) Date of Patent: *Mar. 31, 2015

(54) DISTRIBUTED LOCATER, ALERT, REPEATER, AND/OR CALL TECHNOLOGIES FOR COMMUNICATION DEVICES

(71) Applicant: AT&T Mobility II LLC, Atlanta, GA (US)

(72) Inventors: Max Faulkner, Roswell, GA (US); Erick Haughn, Norcross, GA (US); John Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,194

(22) Filed: Jul. 1, 2014

(65) Prior Publication Data

US 2014/0315530 A1     Oct. 23, 2014

Related U.S. Application Data

(63) Continuation of application No. 12/620,164, filed on Nov. 17, 2009, now Pat. No. 8,798,604.

(51) Int. Cl.
*H04M 3/24*       (2006.01)
*H04M 3/54*       (2006.01)
(Continued)

(52) U.S. Cl.
CPC .......... *H04M 3/543* (2013.01); *H04M 3/42263* (2013.01); *H04W 68/00* (2013.01); *H04W 4/16* (2013.01); *H04W 68/005* (2013.01);
(Continued)

(58) Field of Classification Search
USPC ................ 455/415–420, 458, 465, 466, 517, 455/550.1, 554.1, 555, 556.1, 556.2, 557, 455/566, 567, 450, 403, 454; 370/347, 280, 370/252, 338, 431, 329; 725/126, 131; 375/260, 368; 380/270, 247
See application file for complete search history.

(56) References Cited

U.S. PATENT DOCUMENTS 6,314,124 B1   11/2001  Infosino
2004/0125931 A1*  7/2004  Archer ..................... 379/201.01
(Continued)

OTHER PUBLICATIONS

Non-Final Office Action for U.S. Appl. No. 12/620,164 dated Nov. 22, 2011. 14 pgs.
(Continued)

*Primary Examiner* — Mahendra Patel
(74) *Attorney, Agent, or Firm* — Amin, Turocy & Watson, LLP

(57) ABSTRACT

Distributed locater, alert, repeater, and call technologies for communication devices are presented herein. A base component can be configured to receive a message at a base unit, the message corresponding to at least one of a call directed to a wireless communication device or another message directed to at least one of the wireless communication device or a wired communication device. The base component can distribute an alert to at least one remote unit based on the message. A remote component can be configured to receive the alert at the at least one remote unit, and broadcast the alert or another alert from the at least one remote unit. An interface component can be configured to receive an input at the at least one remote unit based on the alert. Further, the remote component can be configured to transmit a response based on the input.

20 Claims, 20 Drawing Sheets

(51) Int. Cl.
  *H04M 3/42* (2006.01)
  *H04W 68/00* (2009.01)
  *H04W 4/16* (2009.01)
  *H04W 4/06* (2009.01)
  *H04W 4/14* (2009.01)
  *H04W 88/04* (2009.01)

(52) U.S. Cl.
  CPC ......... *H04M2203/1091* (2013.01); *H04W 4/06* (2013.01); *H04W 4/14* (2013.01); *H04W 88/04* (2013.01)
  USPC ............................ 455/417; 455/466; 380/270

(56) References Cited

U.S. PATENT DOCUMENTS

2004/0176142 A1* 9/2004 Thrasher ..................... 455/566
2005/0007978 A1 1/2005 Slemmer et al.
2005/0078829 A1 4/2005 Knechtel et al.
2005/0090234 A1* 4/2005 Ioku et al. ................... 455/412.2
2005/0266891 A1* 12/2005 Mullen ......................... 455/567
2006/0194608 A1 8/2006 Lemke et al.
2007/0037605 A1* 2/2007 Logan .......................... 455/567
2007/0165589 A1 7/2007 Sakoda
2009/0191921 A1 7/2009 Manatrey
2010/0035594 A1 2/2010 Vendrow et al.
2010/0203927 A1* 8/2010 Biddy et al. .................. 455/567

OTHER PUBLICATIONS

Final Office Action for U.S. Appl. No. 12/620,164 dated May 24, 2012. 16 pgs.
Notice of Allowance for U.S. Appl. No. 12/620,164 dated Mar. 31, 2014. 17 pgs.

* cited by examiner

US 8,995,977 B2

DISTRIBUTED LOCATER, ALERT, REPEATER, AND/OR CALL TECHNOLOGIES FOR COMMUNICATION DEVICES

CROSS-REFERENCE TO RELATED APPLICATION

This application is a continuation of, and claims priority to, U.S. patent application Ser. No. 12/620,164, filed Nov. 17, 2009, and entitled "Distributed Locater, Alert, Repeater, and/or Call Technologies for Communication Devices," the entirety of which is incorporated herein by reference.

TECHNICAL FIELD

This disclosure relates generally to communication technology and, more particularly, to distributed locater, alert, repeater, and/or call technologies for communication devices.

BACKGROUND

Wireless communication devices, e.g., cellular phones, personal digital assistants, smartphones, and the like, are ubiquitous. Such devices are commonly used by people within a home or an office to communicate with others. Although a wireless communication device can alert a subscriber, e.g., via sound(s), vibration(s), etc., when a phone call is directed to the wireless communication device, if the subscriber is away from the wireless communication device, e.g., on a floor of a building different from where the wireless communication device is located, the subscriber will not be aware of the phone call.

The above-described deficiencies of today's wireless communication networks and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
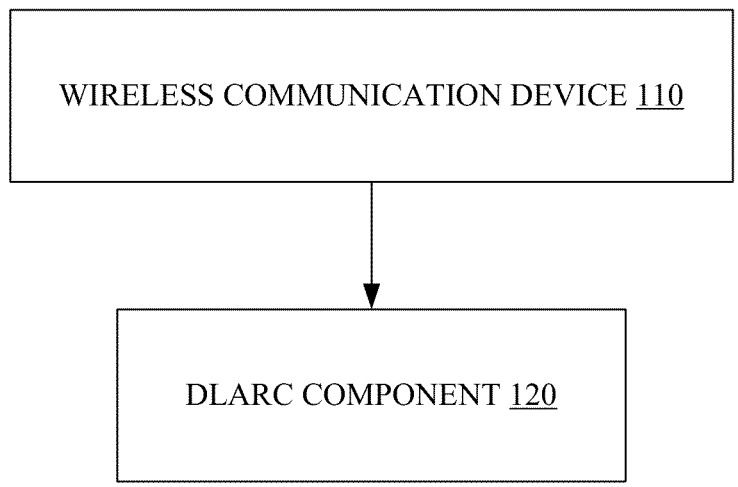
FIG. 1 illustrates a wireless network including a distributed locater, alert, repeater, and call (DLARC) component, in accordance with an embodiment.

The following description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following detailed description of the disclosed subject matter when considered in conjunction with the drawings.

Various non-limiting embodiments of systems, methods, and apparatus presented herein utilize distributed locater, alert, repeater, and call (DLARC) technologies for alerting one or more people in a building of phone call(s) and/or message(s) received by one or more wireless communication devices.

When a subscriber is away from a wired and/or wireless communication device, e.g., when in/on a different room/floor of a building where the wired/wireless communication device is located, the subscriber may not be aware that a call/message is directed to the wired/wireless communication device. Moreover, the subscriber may not be aware that a call/message is directed to the wired/wireless communication device when the wired/wireless communication device is not powered. To correct for these and other drawbacks of conventional communication techniques, various systems, methods, and apparatus described herein utilize distributed locater, alert, repeater, and/or call technologies for communication devices. An example implementation is known as distributed locater, alert, repeater, and call (DLARC) technology.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), etc.

Additionally, one or more embodiments described herein can include legacy telecommunication technologies, e.g., plain old telephone service (POTS). Further, selections of a radio technology can include second generation (2G), third generation (3G), and fourth generation (4G) evolution of the radio technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal). As another example, a component can be an apparatus with specific functionality provided by mechanical parts operated by electric or electronic circuitry; the electric or electronic circuitry can be operated by a software application or a firmware application executed by one or more processors, the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via base component 510 (described below), to automatically distribute an alert from a base unit to at least one remote unit, the alert corresponding to a call/message directed to a remote device. In another example, the artificial intelligence system can be used, via remote component 520 (described below), to automatically broadcast the alert, or another alert, from at least one remote unit via audio and/or visual means (see below).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s);

optical disk (e.g., compact disk (CD), digital video disc (DVD), Blu-ray Disc™ (BD)); smart card(s); and flash memory device(s) (e.g., card, stick, key drive).

Moreover, terms like "user equipment," (UE) "mobile station," "mobile subscriber station," "access terminal," "terminal", "handset," "appliance," "machine," "wireless communication device," "cellular phone," "personal digital assistant," "smartphone," and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, which can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to systems, methods, and apparatus associated with distributed locater, alert, repeater, and call (DLARC) technologies for alerting one or more people in a building of phone call(s) and/or message(s) received by one or more wireless communication devices and/or message(s) received by one or more wired communication devices. As described above, conventional communication techniques can reduce a subscriber's experience(s) because the subscriber can miss calls/messages directed to a wired and/or a wireless communication device when the subscriber is away from the wired and/or the wireless communication device, and/or when the wired and/or the wireless communication device is powered off. Compared to such techniques, various systems, methods, and apparatus described herein facilitate alerting the subscriber of calls/messages directed to a wireless communication device, and/or of messages directed to a wired communication device, via DLARC technology utilized in a wireless network.

The wireless network can include a local wireless communications cite (or base station), which can use a licensed radio spectrum operated and controlled by a wireless service provider. A mobile device, or wireless communication device, operated by a subscriber within a coverage area typically communicates with a core network via the base station. The mobile device can register with the base station and communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

FIG. 1 illustrates a wireless network 100 including a DLARC component 120 for alerting one or more people in a building of phone call(s) and/or message(s), e.g., SMS message(s), MMS message(s), IM message(s), email, Unstructured Supplementary Services Data (USSD), etc. directed to one or more communication devices, in accordance with an embodiment. As described above, when a subscriber is away from a wired and/or a wireless communication device, the subscriber can miss a call/message directed to the wireless communication device, e.g., when the subscriber is on a different floor of a building from where the wireless communication device is located; or the subscriber can miss a message directed to the wired communication device. Accordingly, when the call/message is directed to the wireless communication device, or the message is directed to the wired communication device, DLARC component 120 can alert the subscriber of the call/message via one or more DLARC remote units (not shown) located in different areas of the building.

In an aspect, wireless communication device 110 can send a message/signal, e.g., via wireless and/or wired means, to DLARC component 120 indicating the call/message is directed to the wireless communication device. Correspondingly, DLARC component 120 can distribute an alert via the one or more DLARC remote units based on the message/signal. For example, the alert can include any means for indicating a call is directed to wireless communication device 110, such as various audio means, e.g., ringtone(s) broadcast via speakers internal and/or external to the one or more DLARC remote units; and/or visual means, e.g., lights internal and/or external to the one or more DLARC remote units.

It should be appreciated that one or more aspects of DLARC component 120 can be located/included within and/or or across one or more components, e.g., hardware, software, etc., of wireless network 100, e.g., within or among hardware and/or software of components of wireless communication device 110, or a macro network (see, e.g., below) of wireless network 100.

Figure 2:
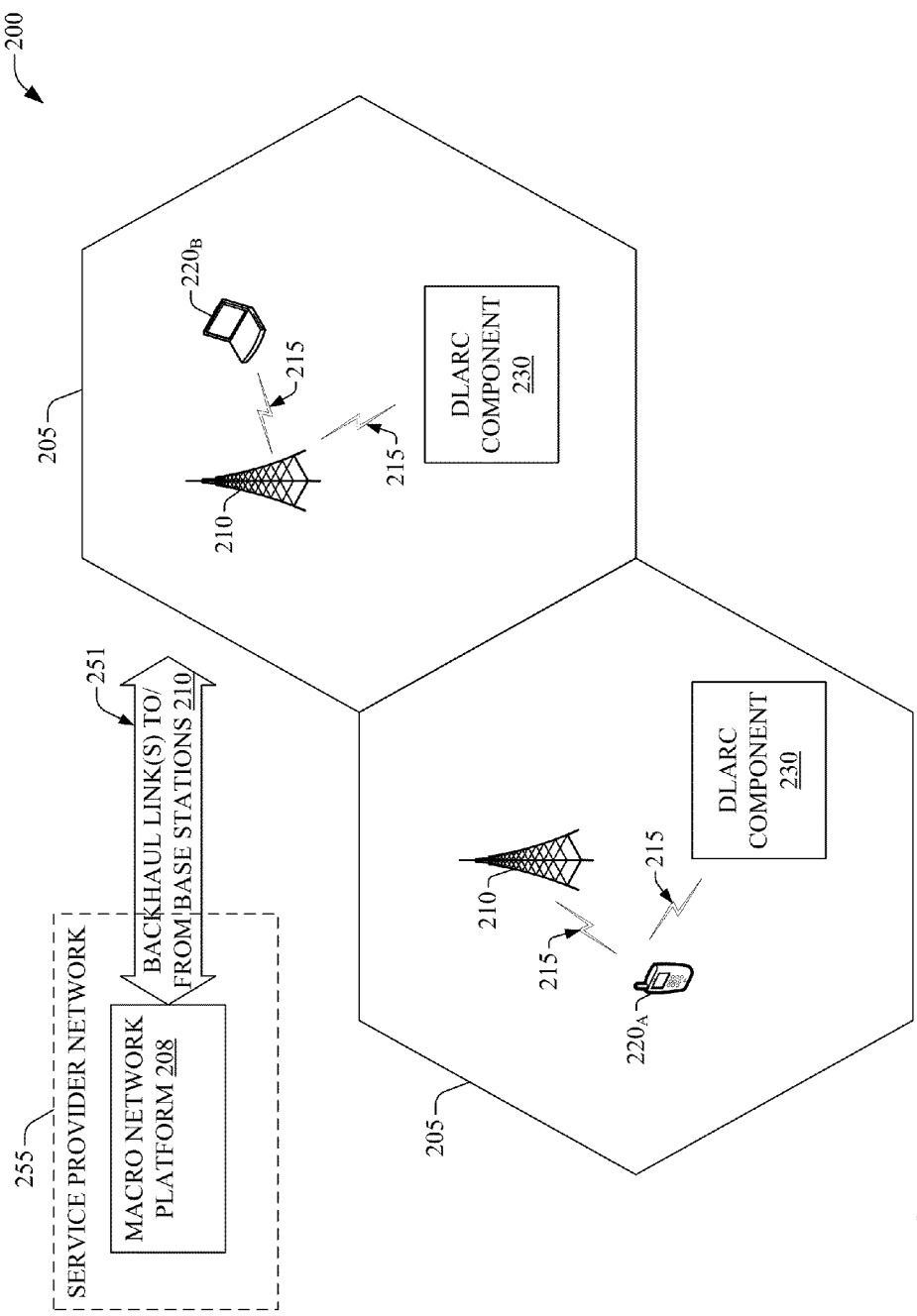
FIG. 2 illustrates another wireless network including a DLARC component, in accordance with an embodiment.

In another aspect illustrated by FIG. 2, a wireless network 200 can include a wireless communications cite, or base station 210, which can use a licensed radio spectrum operated and controlled by a wireless service provider. Wireless communication devices $220_A$ and $220_B$ can be operated by a subscriber within a "macro" cell coverage area, e.g., macro cell 205, served by base station 210. It should be appreciated that although macro cells 205 are illustrated as hexagons, macro cells 205 can adopt other geometries generally dictated by a deployment or topography of the macro cell coverage area, or covered geographic area, e.g., metropolitan statistical area (MSA), rural statistical area (RSA), etc. Macro cell coverage is generally intended to serve wireless communication devices $220_A$ and $220_B$ in outdoor locations. An over-the-air wireless link 215 provides the macro coverage and comprises a downlink (DL) and an uplink (UL) (both not shown) that can utilize a predetermined band of radio frequency (RF) spectrum associated with, e.g., GSM, 3GPP UMTS. Accordingly, wireless communication device $220_A$ can be a GSM and/or 3GPP UMTS mobile phone, while wireless communication device $220_B$ can be a remote computing device with GSM and/or 3GPP UMTS capabilities.

Base station 210—including associated electronics, circuitry and/or components—and wireless link 215 form a radio network, e.g., base station subsystem (BSS) associated with a GSM wireless network, or radio access network (RAN) associated with a UMTS wireless network. In addition, base station 210 communicates with macro network platform 208 via backhaul link(s) 251. Macro network platform 208 is associated with service provider network 255, or a core network, which can comprise one or more cellular technologies, e.g., 3GPP UMTS, GSM, etc. In one aspect, macro network platform 208 controls a set of base stations 210 that serve either respective cells or a number of sectors within such cells. Macro network platform 208 can also communicate with other base stations (not shown) that serve other cells (not shown). Backhaul link(s) 251 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 251 can link disparate base stations 210 based on macro network platform 208.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous DSL, ADSL, coaxial cable, etc. To this end, base station 210 is typically connected to the backhaul network, e.g., service provider network 255, via a broadband modem (not shown) and backhaul link(s) 251. Through backhaul link(s) 251, base station 210 can handle substantially any quality of service (QoS) for heterogeneous packetized traffic, e.g., various multiple packet flows.

Further, base station 210 can integrate into the core network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

As described above, conventional wireless communication technology can reduce a subscriber's experience(s) because the subscriber can miss a call/message directed to a wireless communication device when the subscriber is away from the wireless communication device, and/or when the wireless communication device is not powered. Compared to such technology, various systems, methods, and apparatus described herein utilize DLARC technology in a wireless network to facilitate alerting one or more subscribers of calls/messages directed to wireless communication device(s).

Referring now to FIG. 2, DLARC component 230 can couple to wireless communication device $220_A$/$220_B$ via wireless link 215 associated with the one or more cellular technologies. As such, DLARC component 230 can include one or more wireless access points (not shown) to facilitate communication via wireless link 215. The one or more wireless access points can include a microcell access point, a picocell access point, a femtocell access point, or other wireless based access points associated with the one or more cellular technologies. For example, wireless communication device $220_A$/$220_B$ can send a wireless signal via the one or more cellular technologies to DLARC component 230 to indicate a call/message is directed to wireless communication device $220_A$/$220_B$. In another aspect, DLARC component 230 can couple to base station 210 via wireless link 215, e.g., base station 210 can send a wireless signal via the one or more cellular technologies to DLARC component 230 to indicate a call/message is directed to wireless communication device $220_A$/$220_B$. When DLARC component 230 receives a wireless signal/message from wireless communication device $220_A$/$220_B$ and/or base station 210, DLARC component 230 can alert subscriber(s) of an associated call/message via one or more DLARC remote units (not shown).

It should be appreciated that although DLARC component 230 is illustrated in FIG. 2 as an entity distinct from, e.g., base stations 210, wireless communication devices $220_A$ and $220_B$, service provider network 225, etc., aspects and/or features of DLARC component 230 can be located/included within and/or across one or more components, e.g., hardware, software, etc., of wireless network 200. For example, in one embodiment, DLARC component 230 can be located within any component(s) of a GSM and/or UMTS core network, e.g. service provider network 255. In another embodiment, DLARC component 230 can be located in hardware and/or software of base stations 210 and/or wireless communication devices $220_A$ and $220_B$.

Figure 3:
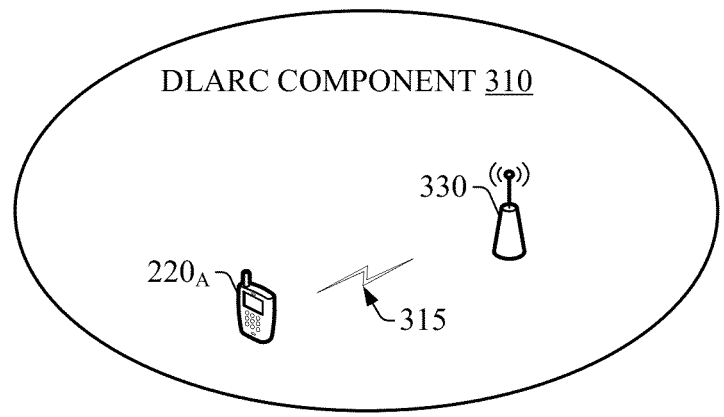
FIG. 3 illustrates yet another wireless network including a DLARC component, according to an embodiment.
Figure 3:
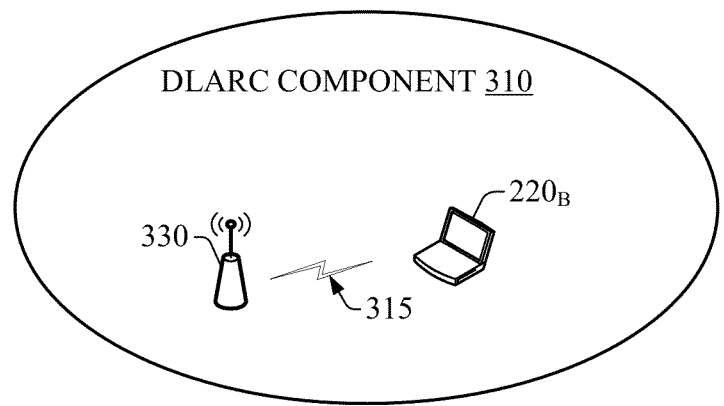

In another aspect illustrated by FIG. 3, wireless network 300 can include DLARC component 310, which can include a wireless access point 330. Wireless access point 330 can include an infrared (IR) interface, a WiMAX™ access point, a Bluetooth™ access point, or other wireless-based access points. As such, wireless communication device $220_A$/$220_B$ can couple to DLARC component 310, e.g., wireless access point 330, via wireless link 315 utilizing infrared radiation, WiMAX™, Bluetooth™, or other wireless technology. Accordingly, wireless communication device $220_A$/$220_B$ can send a wireless signal via such wireless technology to DLARC component 310, indicating a call/message is directed to wireless communication device $220_A$/$220_B$. Further, DLARC component 310 can alert subscriber(s) of an associated call/message via one or more DLARC remote units (not shown) when DLARC component 310 receives, or approximately when DLARC component 310 receives, the wireless signal/message via wireless access point 330.

Figure 4:
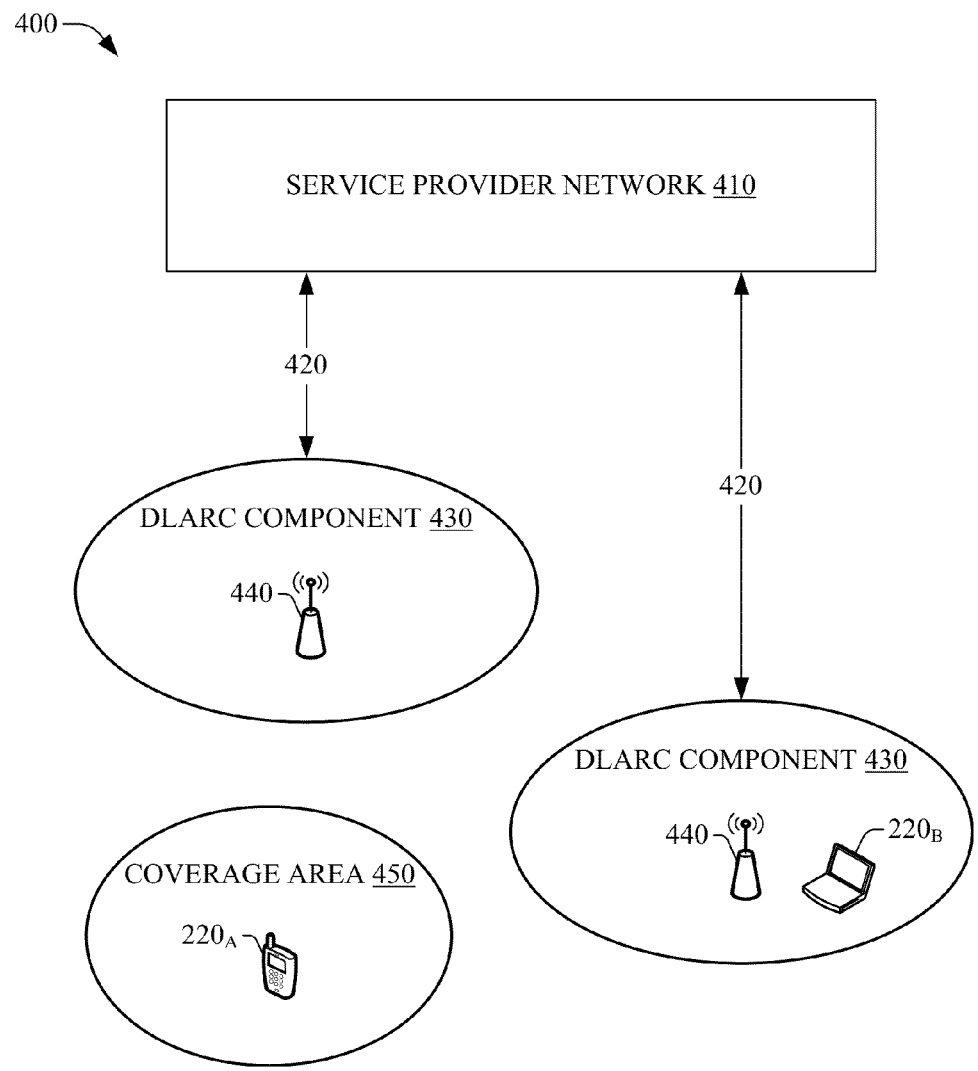
FIG. 4 illustrates a wireless network including a DLARC component that facilitates alerting a subscriber via a wired interface, in accordance with an embodiment.

FIG. 4 illustrates a wireless network 400 including a DLARC component 430 that facilitates alerting a subscriber via a wired interface 420, in accordance with an embodiment. Wired interface 420 couples DLARC component 430 with service provider network 410. Service provider network 410 can be a core network similar to service provider network 255 (see above), and can include a macro network platform (not shown), e.g., macro network platform 208. Further, in an aspect, service provider network 410 can be coupled to base stations (not shown), via a wired link, e.g., optical fiber, twisted-pair line, T1/E1 phone line, synchronous or asynchronous DSL, ADSL, coaxial cable, etc. In another aspect, service provider network 410 can couple to DLARC component 430 via similar wired links, or wired interface 420, e.g., optical fiber, twisted-pair line, T1/E1 phone line, synchronous or asynchronous DSL, ADSL, coaxial cable, etc.

As illustrated by FIG. 4, wireless communication device $220_A$ can be associated with coverage area 450, which is a wireless coverage area from which wireless communication device 220$_A$ can wirelessly communicate with various access points associated with wireless network 400, e.g., wireless access points 440 of DLARC components 430. Wireless access points 440 can include a microcell access point, a picocell access point, a femtocell access point, or other wireless based access points associated with the one or more cellular technologies. Further, wireless access points 440 can include a WiMAX™ access point, a Bluetooth™ access point, or other wireless-based access points facilitating wireless communication between DLARC components 430 and wireless communication devices, e.g., wireless communication device 220$_A$/220$_B$.

When coverage area 450 is out of range of wireless access points 440 and/or other wireless access points of wireless network 400, e.g., when wireless communication device 220$_A$ is left by a subscriber many miles away from the subscriber's home and/or office associated with DLARC component 430, DLARC component 430 can receive a signal/message from service provider network 410 via wired interface 420 indicating a call/message is directed to wireless communication device 220$_A$. In one aspect described below, DLARC component 430 can facilitate receiving/accepting the call/message via DLARC component 430, e.g., via various input means, including, but not limited to, text communication utilizing a keypad, audio communication utilizing a microphone, etc.

In another aspect illustrated by FIG. 4, when a call/message is directed to wireless communication device 220$_B$, which is within wireless range of wireless access points 440 (or other wireless access points associated with wireless network 400), but is powered off, DLARC component 430 can receive a signal/message from service provider network 410 via wired interface 420 indicating a call/message is directed to wireless communication device 220$_B$. Further, DLARC component 430 can facilitate receiving/accepting the call/message via DLARC component 430 (see below).

In yet another aspect (not shown), when a message, e.g., email, text message, etc. is directed to a wired communication device, e.g., laptop, personal computer, home theater, etc. DLARC component can receive a signal/message via wired interface 420 indicating the message is directed to the wired communication device. Moreover, DLARC component 430 can facilitate receiving/accepting the message, e.g., responding to an email, via DLARC component 430.

Aspects of wireless network 400, and the wireless environments, networks, systems, apparatus, and processes explained herein, can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Figure 5:
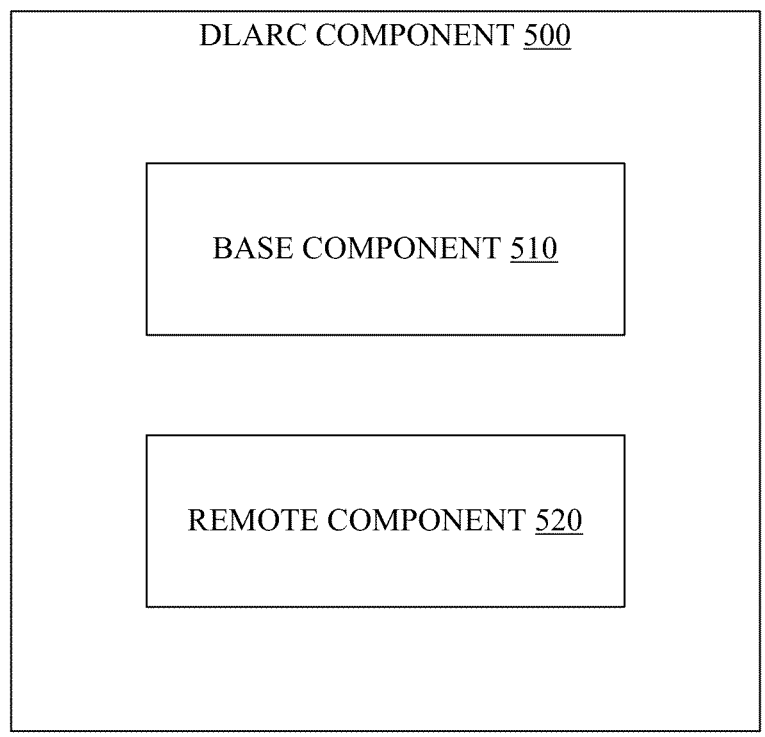
FIG. 5 illustrates a DLARC component including a base component and a remote component, in accordance with an embodiment.

FIG. 5 illustrates a DLARC component 500, in accordance with an embodiment. DLARC component 500 can include a base component 510 and a remote component 520. Base component 510 can be configured to receive a message at a base unit (not shown), the message corresponding to at least one of a call directed to a wireless communication device (not shown) or an other message, e.g., SMS message, MMS message, IM message, email, USSD, etc. directed to the wireless communication device and/or a wired communication device (not shown). In one aspect, the at least one of the call or the other message can be directed to a cellular phone, a personal digital assistant, a smartphones, a laptop computer, a personal computer, etc. via a wireless protocol, e.g., 3GPP UMTS, GSM, etc.

In another aspect, base component 510 can be configured to receive the message at the base unit via a wired interface (not shown) e.g., wired interface 420. In yet another aspect, base component 510 can be configured to receive the message at the base unit via a wireless interface (not shown). The wireless interface can include at least one of: an infrared interface; a microcell; a microcell access point; a picocell; a picocell access point; a femtocell; a femtocell access point; a Wi-Fi™ access point; a WiMAX™ access point; a Bluetooth™ access point; an Enhanced GPRS access point; a 3GPP access point; an LTE™ access point; a 3GPP2 access point; a UMB access point; a 3GPP UMTS access point; an HSPA access point; a HSDPA access point; a HSUPA access point; an LTE-A access point; or a GSM access point.

Further, base component 510 can be configured to distribute an alert and/or communication from the base unit to at least one remote unit (not shown) based on the message, e.g., when, or approximately when, the at least one of the call or the message is transmitted to the wireless communication device, e.g., via base station 210, or the message is transmitted to the wired communication device. In an aspect, base component 510 can be configured to distribute the alert from the base unit to the at least one remote unit via a wired interface (not shown), e.g., optical fiber, twisted-pair line, T1/E1 phone line, synchronous or asynchronous DSL, ADSL, coaxial cable, etc.

In another aspect, base component 510 can be configured to distribute the alert from the base unit to the at least one remote unit via a wireless interface (not shown). The wireless interface can include at least one of: an infrared interface; a microcell; a microcell access point; a picocell; a picocell access point; a femtocell; a femtocell access point; a Wi-Fi™ access point; a WiMAX™ access point; a Bluetooth™ access point; an Enhanced GPRS access point; a 3GPP access point; a LTE™ access point; a 3GPP2 access point; a UMB access point; a 3GPP UMTS access point; a HSPA access point; a HSDPA access point; a HSUPA) access point; an LTE-A access point; or a GSM access point.

Remote component 520 can be configured to receive the alert at the at least one remote unit, e.g., via the wired and/or wireless interface discussed above. In addition, remote component 520 can be configured to broadcast the alert, or an other alert, from the at least one remote unit. In one aspect, remote component 520 can be configured to broadcast the alert, or the other alert, from the at least one remote unit via at least one of an audible means or a visual means. For example, the audible means can include a speaker and/or sound device; and the visual means can include a light emitting diode (LED) and/or other light source. In another aspect, the audible means can emit a ring tone. In yet another aspect, the visual means can emit colored light. In this way, remote component 520 can alert a subscriber of a call/message directed to a wired communication device or a wireless communication device associated with the subscriber, e.g., when the subscriber is away from the wireless communication device and the subscriber is located in a building associated with DLARC component 500; or when the wireless communication device is powered off and the subscriber is located the building associated with DLARC component 500.

Figure 6:
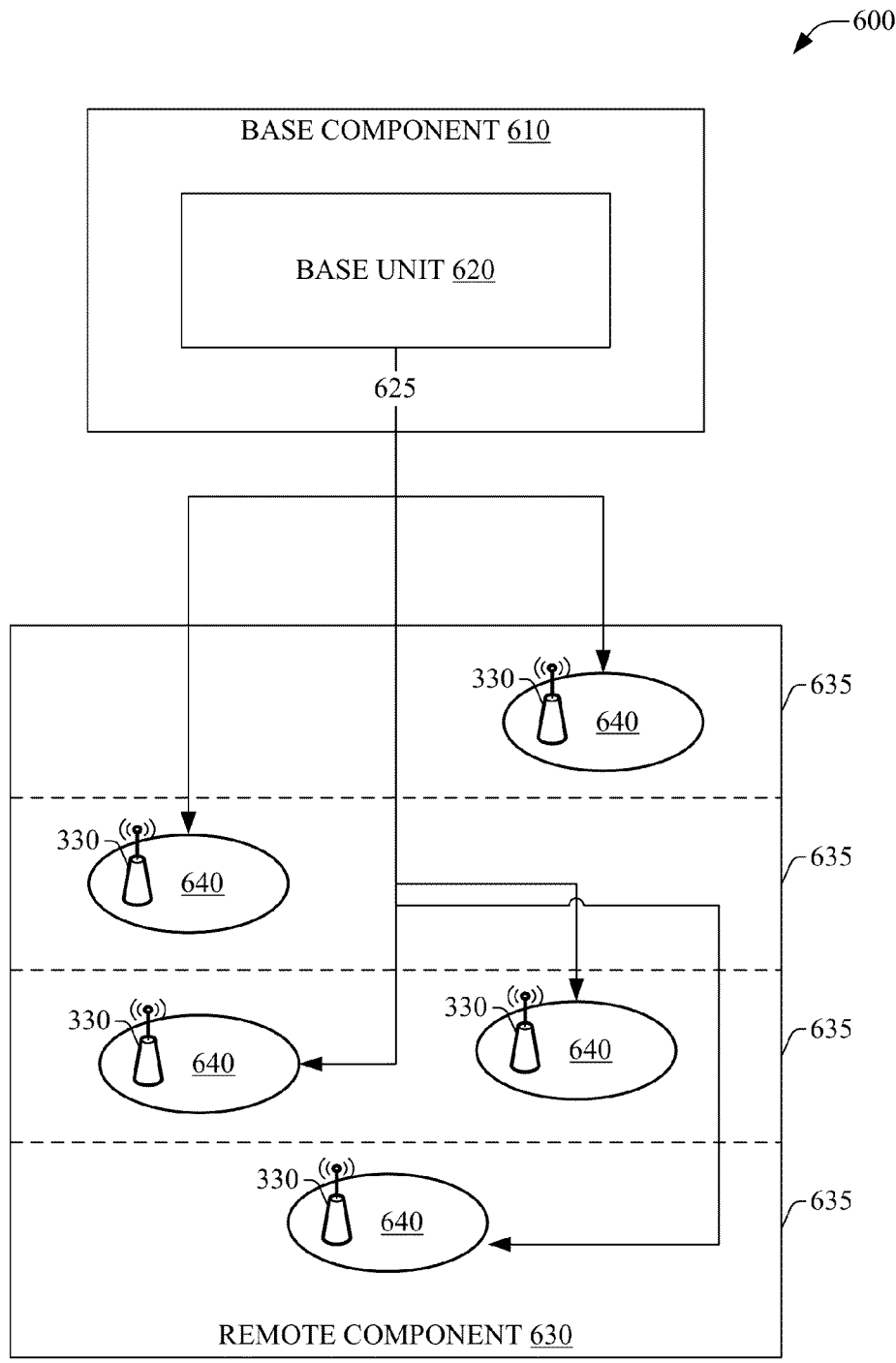
FIG. 6 illustrates a DLARC system including a base component coupled to a remote component, in accordance with an embodiment.

For example, in an embodiment illustrated by FIG. 6, base component 610 can include base unit 620, which can be coupled to remote units 640 of remote component 630 via a wireless and/or wired interface, e.g., interface 625. In an aspect, interface 625 can include at least one of optical fiber, twisted-pair line, T1/E1 phone line, synchronous or asynchronous DSL, ADSL, coaxial cable, etc. In another aspect, interface 625 can include at least one of an infrared interface; a microcell; a microcell access point; a picocell; a picocell access point; a femtocell; a femtocell access point; a Wi-Fi™ access point; a WiMAX™ access point; a Bluetooth™ access point, etc.

As illustrated by FIG. 6, remote units 640 can include wireless access points 330, which can include an IR interface, a WiMAX™ access point, a Bluetooth™ access point, or other wireless-based access points. Further, remote units 640 can be located on different floors 635 of a building (not shown) associated with DLARC component 600. In an aspect, when a call/message is directed to a wireless communication device associated with a subscriber, base unit 620 can be notified, or alerted, via wired and/or wireless means. Further, base unit 620 can distribute an alert to remote units 640 via wireless access points 330. Accordingly, when the subscriber is located in the building, but away from his/her wired/wireless communication device, and/or when the when the wired/wireless communication device is not powered, DLARC system 600 can alert the subscriber of the call/message via DLARC remote units 640. Further, in another embodiment (see below) DLARC component 600 can facilitate receiving/accepting the call/message via interface component 830.

Figure 7:
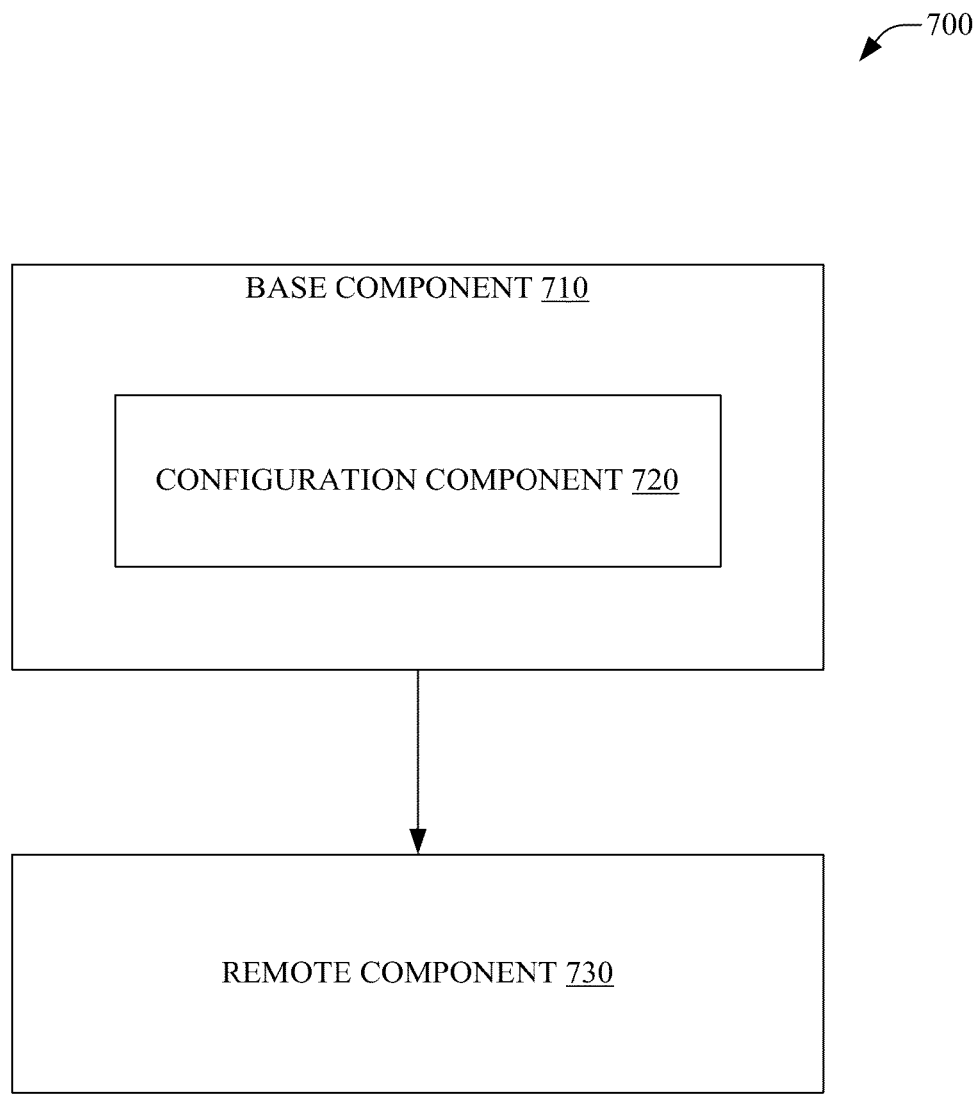
FIG. 7 illustrates a DLARC system including a configuration component, in accordance with an embodiment.

FIG. 7 illustrates a DLARC system 700 including a configuration component 720, according to an embodiment. Configuration component 720 can be configured to receive input from at least one subscriber associated with at least one of the wireless communication device or the wired communication device, e.g., discussed above in relation to DLARC system 600. In an aspect (not shown), configuration component 720 can include an internet, or web-based, interface configured to receive the input, e.g., via input devices 1636 (see below), from the at least one subscriber. For example, the internet interface can facilitate managing and/or configuring different subscriber accounts associated with a DLARC system, e.g., DLARC system 700. In another aspect, the different subscriber accounts can be maintained in a central database, e.g., associated with a wireless service provider. The central database can include various storage media, e.g., disk storage 1624, memory storage 1646, such storage media including, but not limited to: magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive).

In yet another aspect, different subscribers can be associated with one wired/wireless communication device and/or different wired/wireless communication devices. As such, the internet interface can facilitate configuring DLARC system 700, e.g., via the different subscriber accounts, to alert the different subscribers, via remote component 730, utilizing distinct alerts/announcements, e.g., distinct ring tones, distinct sounds, distinct colored lights, etc. Accordingly, base component 710 can be configured to distribute a customized alert to the at least one remote unit based on the input. Further, remote component 730 can be configured to broadcast/transmit the customized alert, or another customized alert from the at least one remote unit, e.g., via at least one of an audible means or a visual means.

Figure 8:
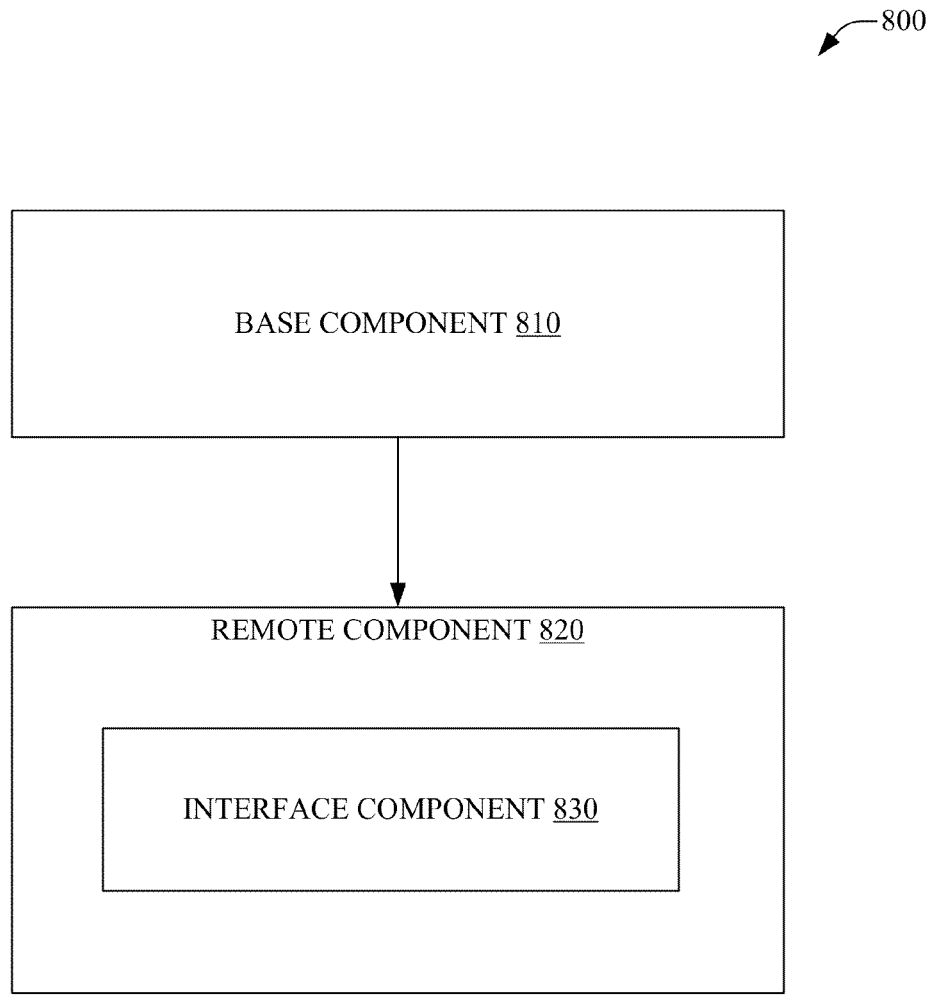
FIG. 8 illustrates a DLARC system including an interface component, in accordance with an embodiment.

Now referring to FIG. 8, a DLARC system 800 including an interface component 830 is illustrated, according to an embodiment. In reference to the discussion of DLARC component 500 above, interface component 830 can be configured to receive an input, e.g., via input device(s) 1650 (see below), input device(s) 1936 (see below), at the at least one remote unit based on the alert. Remote component 820 can be configured to transmit a response to the call, or the other message, e.g., SMS message, MMS message, IM message, email, USSD, etc. from the at least one remote unit based on the input. For example, a subscriber associated with the call or the other message can enter an input, e.g., via an input device, touchpad, keypad, etc. associated with the at least one remote unit when the subscriber senses the alert. Remote component 820 can be configured to transmit a response to the call or the other message when the subscriber enters the input. In one embodiment, remote component 820 can be configured to transmit the response utilizing at least one of a short message service (SMS) protocol, a multimedia messaging service (MMS) protocol, an internet messaging (IM) protocol, email protocol, or USSD protocol. In this way, DLARC system 800 enables a subscriber to receive and/or accept a call/message via interface component 830.

In another embodiment (not shown), interface component 830 can include means for receiving the input, the means for receiving the input including at least one of a telephone handset, a microphone, a video camera, etc. Moreover, interface component 830 can include means for receiving the call or the other message including at least one of a transceiver, display, e.g., a video monitor, a liquid crystal display (LCD), a light emitting diode (LED) display, etc. or the telephone handset.

In yet another embodiment (not shown), and in reference to the discussion of DLARC component 500 above, interface component, e.g., interface component 830, can be configured to receive an input at the at least one remote unit based on the alert. Remote component, e.g., remote component 520 and/or remote component 820, can be configured to at least one of: receive the call or the other message at the at least one remote unit based on the input; or accept the call or the other message at the at least one remote unit based on the input. For example, remote component 520 and/or remote component 820 can be configured to receive or accept the call, or the other message, at the at least one remote unit based on, e.g., a subscriber picking up a telephone handset of the at least one remote unit to answer/receive/accept the call/other message; or the subscriber touching a key on a keypad/input device of the at least one remote unit.

For example, the wireless communication device at which a call is directed can be a computing device associated with VOIP technology. When the call is directed to the computing device, base component, e.g., base component 810, can distribute an alert to remote units, e.g., remote units 640, of remote component 820 via wireless access points 330. Interface 830 can facilitate accepting/receiving the call via remote units 640 utilizing VOW protocol, e.g., via at least one of a telephone handset, a microphone, a video camera, etc.

In another example, when an email is directed to the wireless and/or the wired communication device, base component 810 can distribute an alert to remote units, e.g., remote units 640, of remote component 820 via wireless access points 330. Interface 830 can facilitate accepting/receiving/responding to the email via remote units 640.

In one aspect (not illustrated), remote component 520 and/or remote component 820 can be configured to display a caller identification (ID) at the at least one remote unit, the caller ID associated with the call or the other message. For example, the caller ID can be displayed via a display, e.g., a video monitor, an LCD, an LED display, etc.

FIGS. 9-14 and 17 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
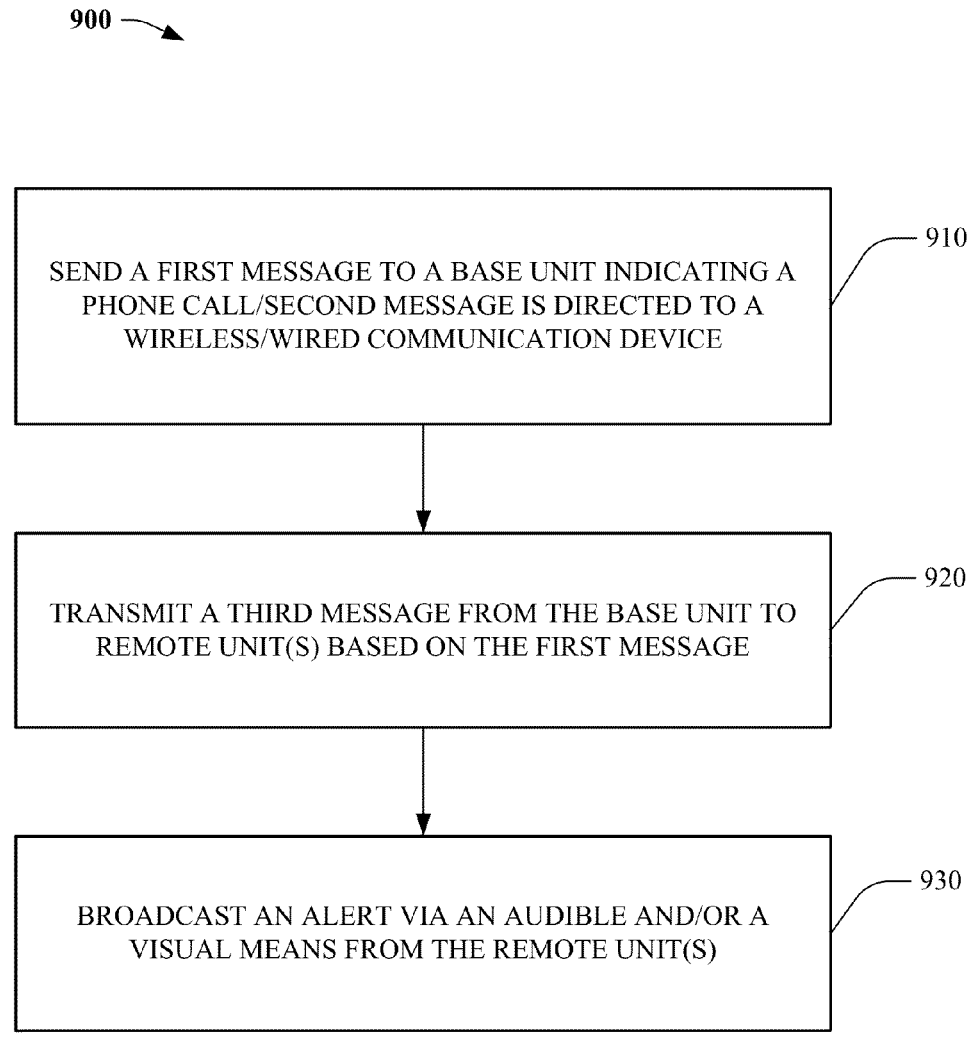
FIG. 9 illustrates a process utilizing DLARC technology for communication devices, in accordance with an embodiment.

Referring now to FIG. 9, a process 900 utilizing DLARC technology for communication devices is illustrated, in accordance with an embodiment. At 910, a first message can be sent to a base unit, e.g., base unit 620, indicating a phone call and/or message, e.g., SMS message, MMS message, IM message, email, USSD, etc. is directed/sent to a wireless communication device, e.g., $220_A/220_B$, or directed/sent to a wired communication device. In an aspect, the first message can be sent via wired and/or wireless means, e.g., optical fiber, twisted-pair line, T1/E1 phone line, synchronous or asynchronous DSL, ADSL, coaxial cable; and/or via wireless access points 330, which can include an IR interface, a WiMAX™ access point, a Bluetooth™ access point, or other wireless-based access points. At 920, a third message can be transmitted from the base unit to one or more remote units, e.g., via the wired and/or wireless means described above, at a time similar and/or substantially similar to another time when the first message is sent to the base unit. Correspondingly, an alert, e.g., sounds and/or light, can be emitted/broadcast via an audible and/or visual means by the remote unit(s). In an aspect, the audible and/or visual means can include a sound source and/or light source, respectively, e.g., a speaker and/or one or more LEDs. In this way, a subscriber can be alerted, e.g., of a call associated with the subscriber's wireless communication device when the subscriber is away from the wireless communication device, or when the wireless communication device is not powered.

Figure 10:
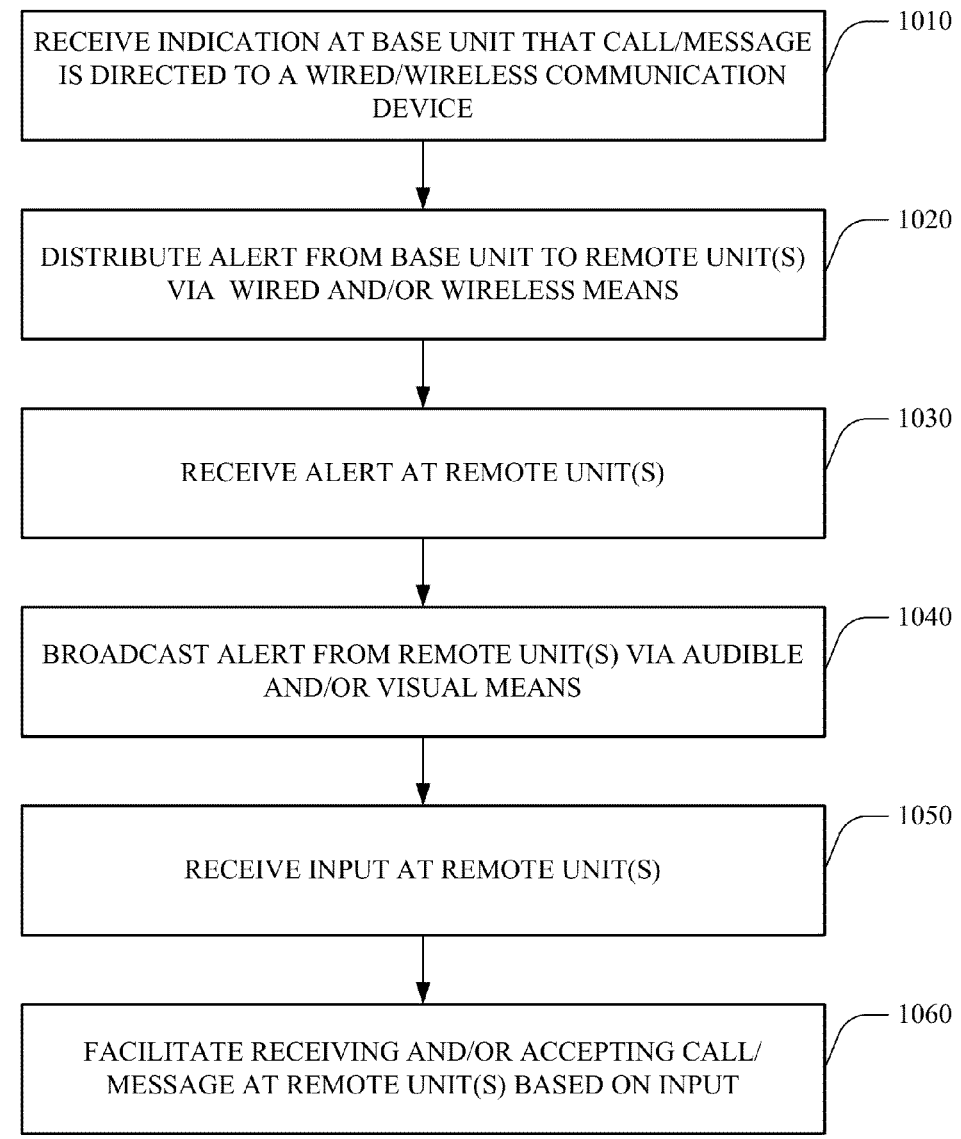
FIG. 10 illustrates another process utilizing DLARC technology for communication devices, in accordance with an embodiment.

FIG. 10 illustrates another process (1000) for utilizing DLARC technology for communication devices, in accordance with an embodiment. At 1010, an indication can be received at a base unit, e.g., via system 600, indicating a call/message is directed to a wireless communication device, or a message is directed to a wired communication device, associated with, e.g., system 600. An alert/message can be distributed from the base unit to one or more remote unit(s) via the wired and/or wireless means (described above) at 1020. Upon receiving the alert/message at 1030, the remote unit(s) can broadcast another alert/notification via the audible and/or visual means (described above) at 1040. Further, upon receiving an input via an input device, e.g., keypad, telephone handset, etc. of a remote unit at 1050, the remote unit can facilitate accepting and/or placing the call/message based on the input at 1060. For example, the remote unit can facilitate transmitting an SMS, MMS, IM message, email, and/or USSD from the remote unit in response to the call/message.

Figure 11:
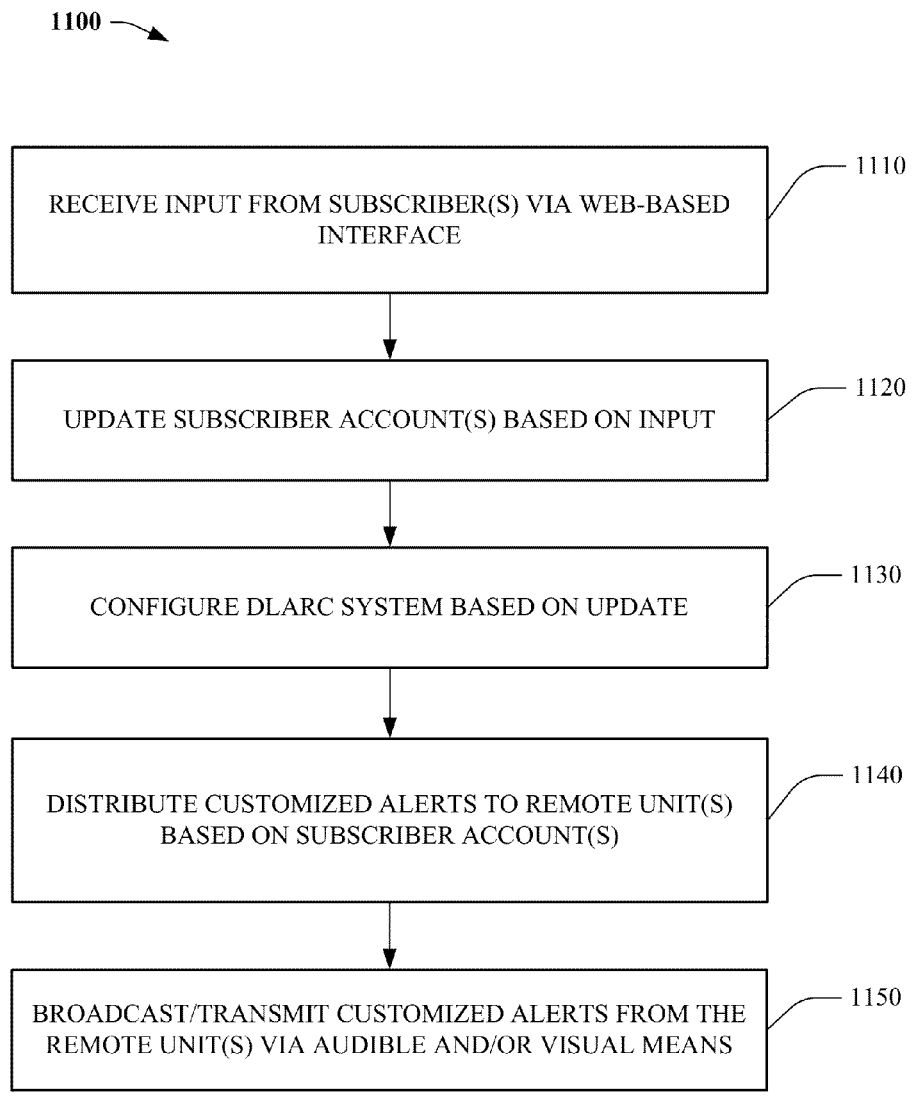
FIG. 11 illustrates yet another process utilizing DLARC technology for communication devices, in accordance with an embodiment.

FIG. 11 illustrates yet another process (1100) utilizing DLARC technology for communication devices, in accordance with an embodiment. At 1110, input can be received from a subscriber associated with, e.g., system 600, via an internet, or web-based, interface. The web-based interface can facilitate managing and/or configuring different subscriber accounts associated with a DLARC system, e.g., DLARC system 600. Such accounts can be maintained in a central database, e.g., associated with a wireless service provider. The central database can include various storage media, e.g., disk storage 1624, memory storage 1646, and not limited to: magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive).

At 1120, an account of the subscriber can be updated based on the input; and the DLARC system can be configured based on the update at 1130. For example, an alert associated with the subscriber can be customized/configured based on the input received at 1110. Accordingly, when a call and/or message associated with a wireless communication device of the subscriber is sent/directed to the wireless communication device, or when a message, e.g., email, is sent/directed to a wired communication device of the subscriber, a customized alert can be distributed to one or more remote units based on the subscriber's account at 1140. The customized alert can be broadcast/transmitted from the one or more remote units via an audible and/or visual means (see above).

Figure 12:
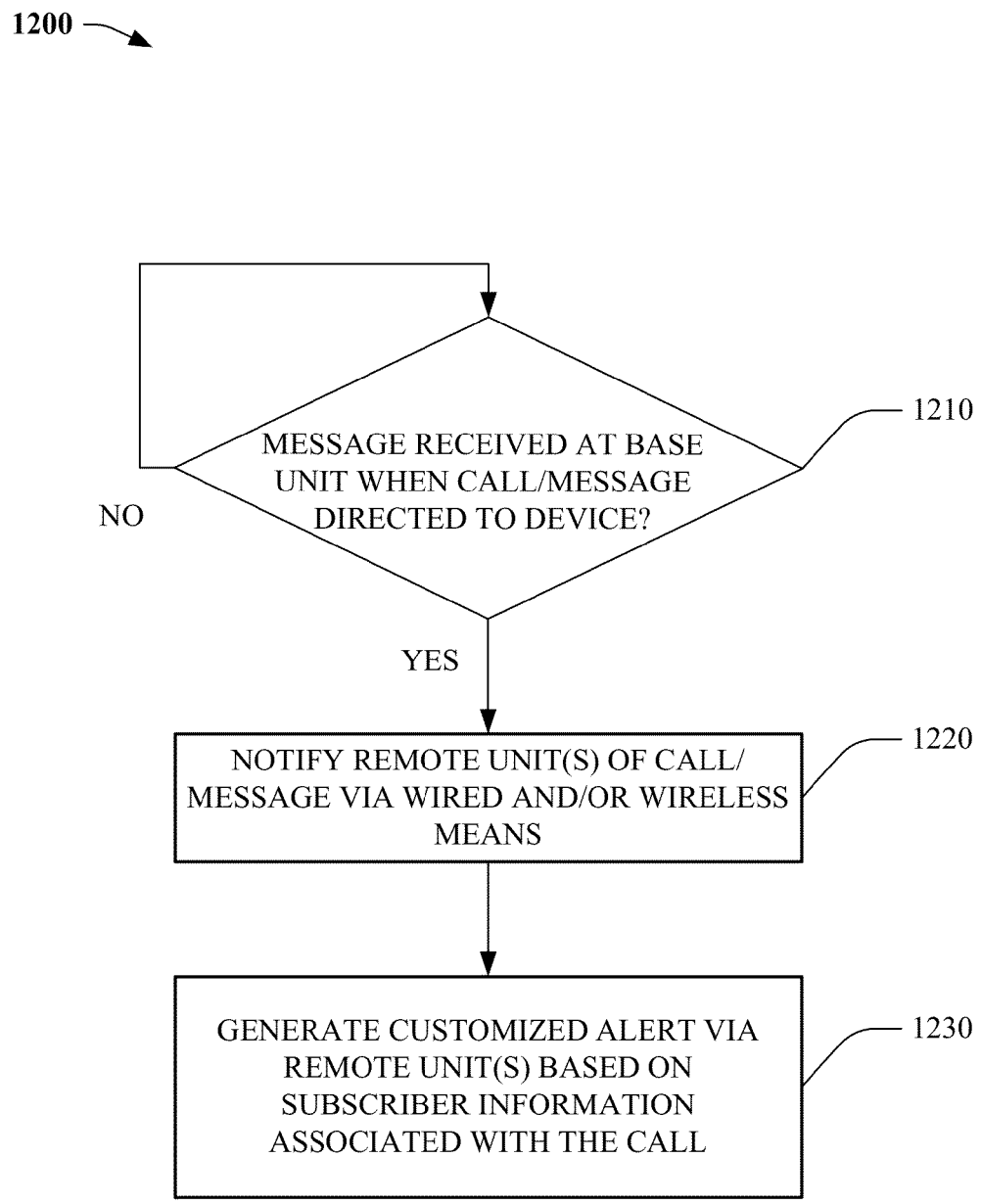
FIG. 12 illustrates a process generating a customized alert via a remote unit, in accordance with an embodiment.

Referring now to FIG. 12 a process 1200 for generating a customized alert via a remote unit is illustrated, in accordance with an embodiment. At 1210, it can be determined whether a message is received at a base unit, e.g., base unit 620, based on a call/another message directed to a wireless/wired device associated with a subscriber. If the message is received at the base unit, the base unit can notify, at 1220, one or more remote units via wired and/or wireless means (see above) to generate an alert. At 1230, the one or more remote units can generate a customized alert, e.g., distinct ring tone(s), distinct sound(s), distinct colored light(s), etc. based on subscriber information associated with the call/message.

Figure 13:
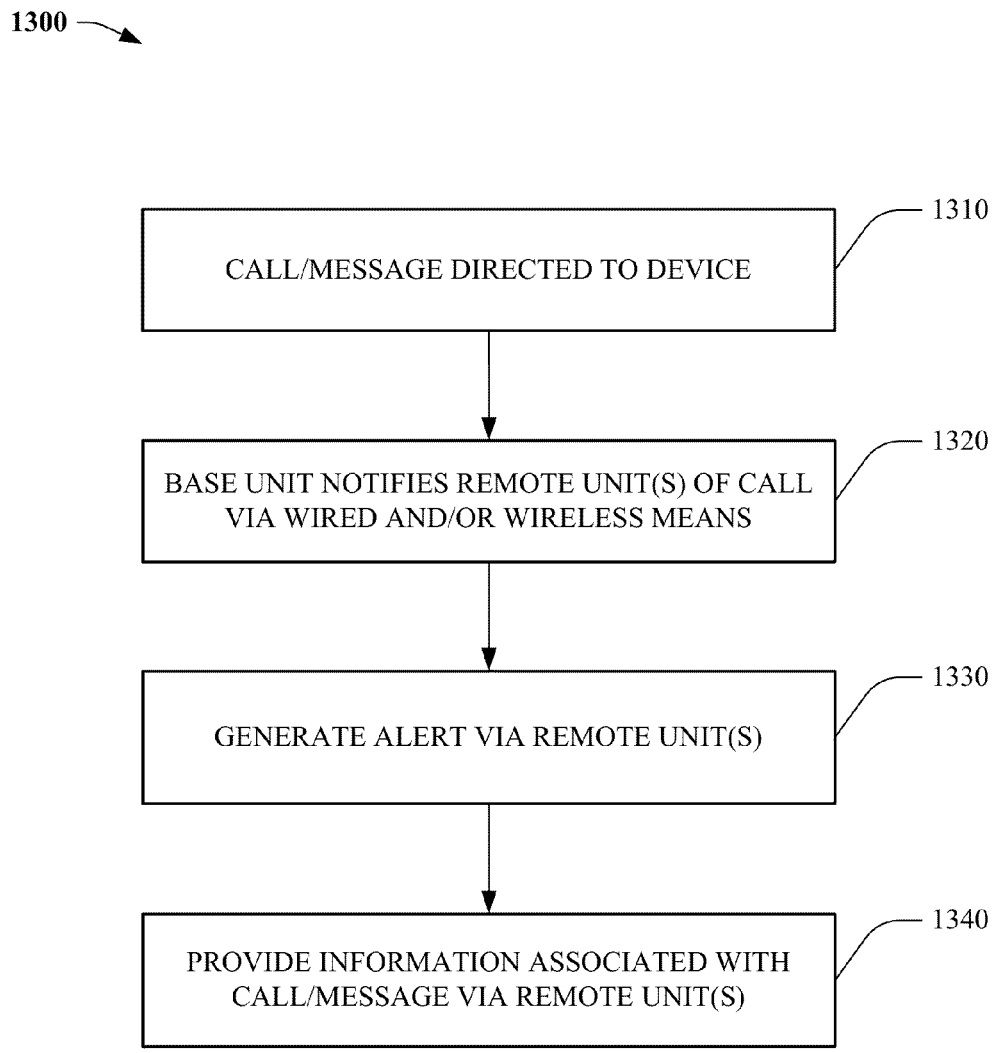
FIG. 13 illustrates a process providing information associated with a call and/or message via remote unit(s), in accordance with an embodiment.

FIG. 13 illustrates a process 1300 for providing information associated with a call and/or message via remote unit(s), in accordance with an embodiment. At 1310, a call or message, e.g., SMS message, MMS message, IM message, email, USSD, etc., can be directed to a mobile device and/or wired device. A base unit, e.g., base unit 620, can notify one or more remote units of the call or message via wired and/or wireless means (see above) at 1320. At 1330, an alert can be generated via the one or more remote units utilizing audible and/or visual means (described above). Information associated with the call or message, e.g., caller ID, can be provided at 1340 via a display device, e.g., LCD, LED, video display, etc.

Figure 14:
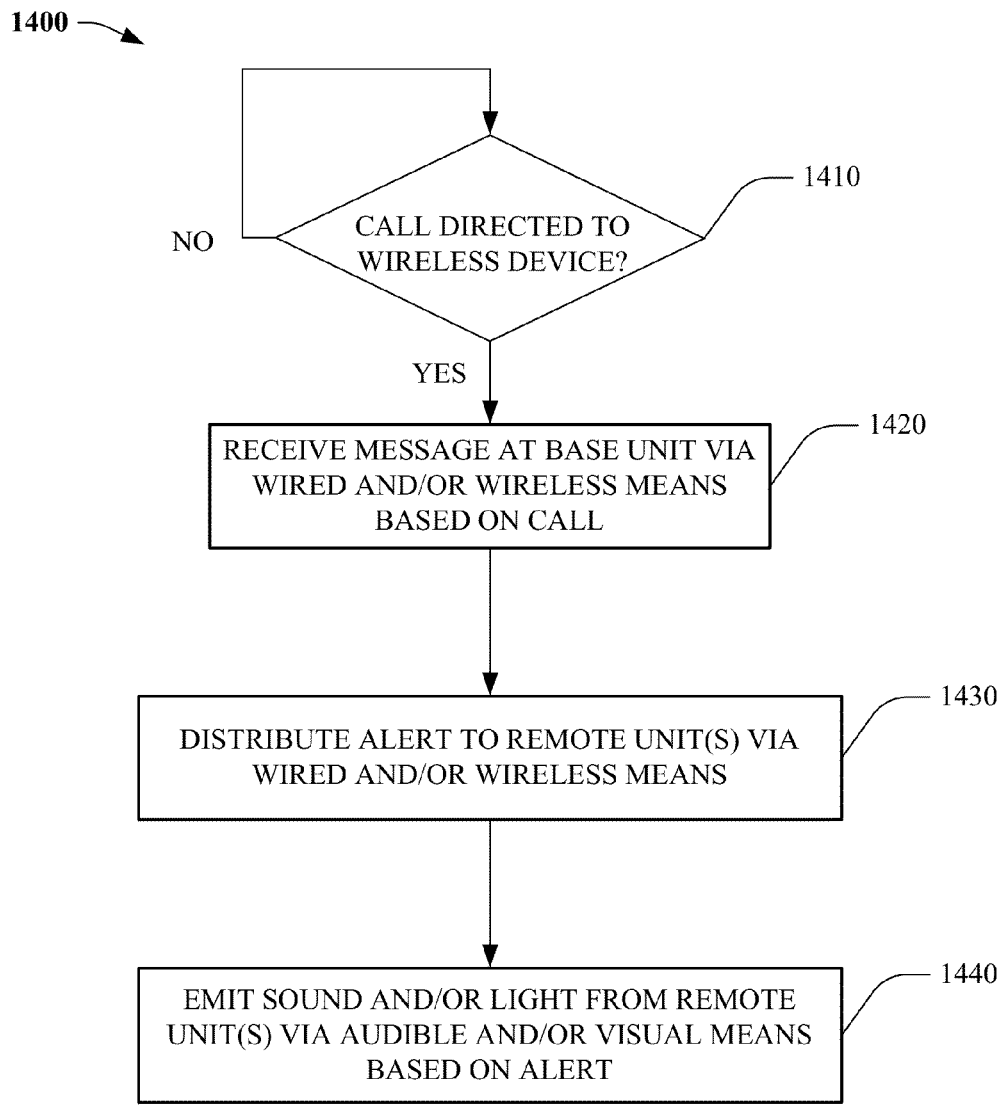
FIG. 14 illustrates a process emitting sound and/or lights via remote unit(s), in accordance with an embodiment.

FIG. 14 illustrates a process 1400 for emitting sound and/or lights via remote unit(s), in accordance with an embodiment. At 1410, it can be determined whether a phone call is directed to a wireless device. If it is determined that the phone call is directed to the wireless device, then a base unit, e.g., base unit 620, can receive a message via wired and/or wireless means (see above) at 1420. At 1430, an alert can be distributed to one or more remote units via a wired and/or wireless means (see above). Sound or light can be emitted from the one or more remote units at 1440 via an audible and/or visual means (see above) based on the alert.

Figure 15:
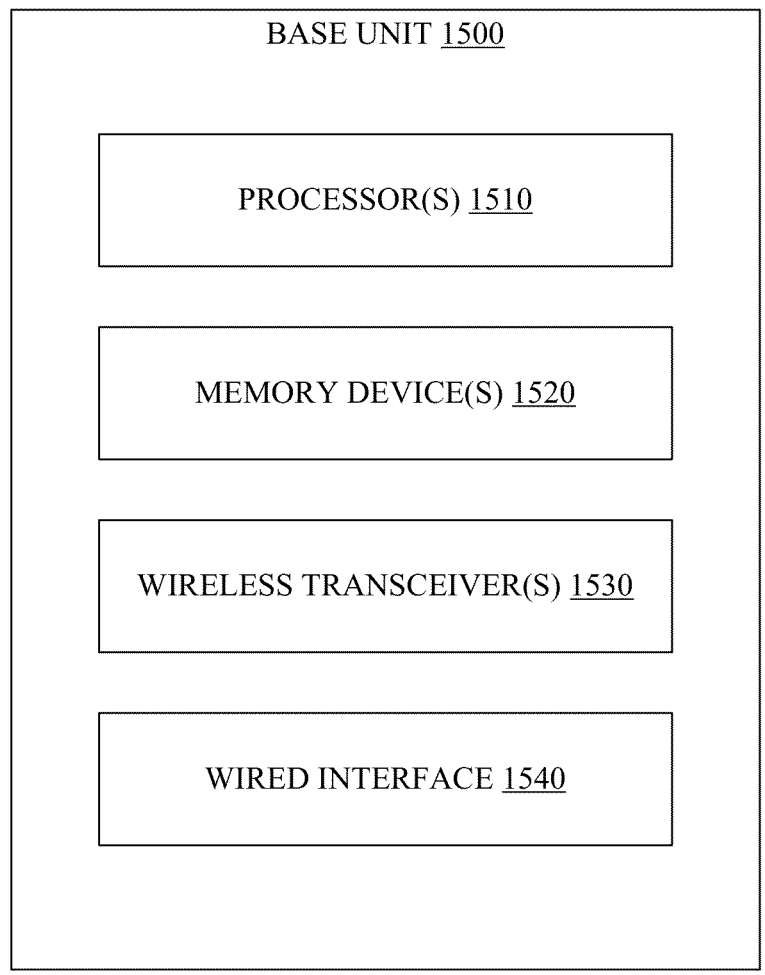
FIG. 15 illustrates a block diagram of a base unit, in accordance with an embodiment.

FIG. 15 illustrates a block diagram of a base unit 1500, in accordance with an embodiment. In an aspect, base unit 1500 can be configured to receive a message corresponding to at least one of a call directed to a wireless communication device or an other message, e.g., SMS message, MMS message, IM message, email, USSD, etc. directed to at least one of the wireless communication device or a wired communication device. Further, base unit 1500 can be configured to distribute an alert to at least one remote unit, e.g., remote unit 640, based on the message for broadcast of the alert by the at least one remote unit or for broadcast of an other alert by the at least one remote unit.

In other aspect(s), base unit 1500 can perform the acts described above related to, e.g., wireless network 400, DLARC component 500, DLARC system 600, DLARC system 700, and DLARC system 800. Further, base unit 1500 can perform acts, via processor(s) 1510, described with respect to FIGS. 9-14. Processors(s) 1510 can perform such acts within base unit 1500 utilizing, e.g., memory device(s) 1520, wireless transceiver(s) 1530, and wired interface 1540. In an aspect (not shown), processor(s) 1510 can perform such acts within base unit 1500 without wired interface 1540. For example, base unit 1500 can communicate with remote units, e.g., remote unit 1600 (see below), via a wireless protocol utilizing wireless transceiver(s) 1630.

In another example, base unit 1500 can be configured to receive the message via a wired interface and/or a wireless interface. In yet another example, base unit 1500 can be configured to distribute the alert to the at least one remote unit via a wired and/or wireless interface, e.g., wirelessly coupled to wireless access point 330, wireless access point 440, etc. In one aspect, base unit 1500 can include a configuration component configured to receive input from at least one subscriber associated with the wired and/or wireless communication device. Further, base unit 1500 can be configured to distribute a customized alert to the at least one remote unit—based on the input—for broadcast of the customized alert by the at least one remote unit or for broadcast of an other customized alert by the at least one remote unit. In another aspect, the customized alert or the other customized alert can include at least one of a ring tone emitted via the at least one remote unit or a color of light emitted via the at least one remote unit, the ring tone and the color of light associated with the at least one subscriber.

In yet another aspect, the configuration component can include an interface configured to receive the input from the at least one subscriber via the Internet.

Figure 16:
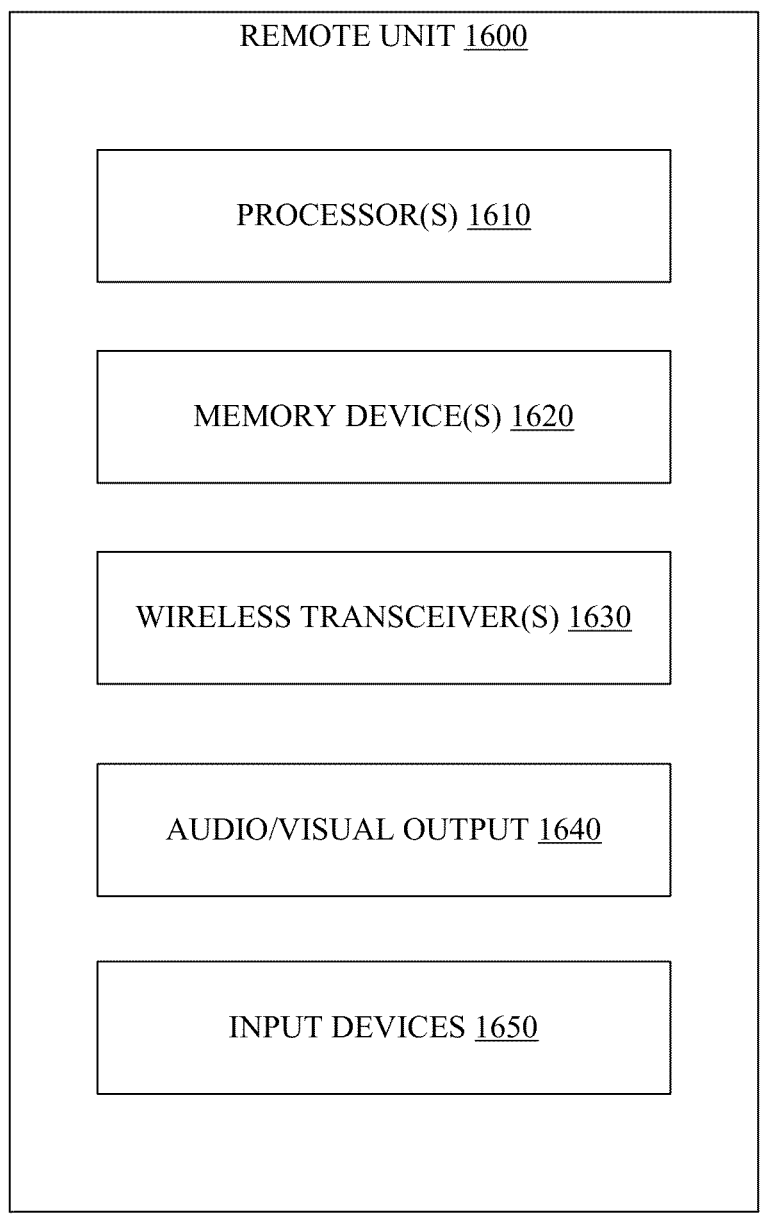
FIG. 16 illustrates a block diagram of a remote unit, in accordance with an embodiment.

FIG. 16 illustrates a block diagram of a remote unit 1600, in accordance with an embodiment. In an aspect, remote unit 1600 can include a remote component (not shown) configured to receive an alert at remote unit 1600, the alert distributed by a base unit, e.g., base unit 1500, based on at least one of a call directed to a wireless communication device or an other message directed to at least one of the wireless communication device or a wired communication device. Further, the remote component can be configured to broadcast the alert, or an other alert, from the remote unit in response to receiving the alert.

In another aspect, the remote component can include an interface component configured to receive an input at the remote unit based on the alert. In addition, the remote component can be further configured to transmit, based on the input, a response to the at least one of the call directed to the wireless communication device or the other message directed to the wireless communication device from the remote unit. For example, the remote component can be configured to transmit the response via at least one of a short message service (SMS) protocol, a multimedia messaging service (MMS) protocol, or an internet messaging (IM) protocol.

In yet another aspect, the remote component can include an interface component (not shown) that can be configured to receive an input at the remote unit based on the alert. Moreover, the remote component can be configured to receive at the remote unit, based on the input, the at least one of the call directed to the wireless communication device or the other message directed to the at least one of the wireless communication device or the wired communication device; and/or accept at the remote unit, based on the input, the at least one of the call directed to the wireless communication device or the other message directed to the at least one of the wireless communication device or the wired communication device.

In one aspect, the remote component can be configured to display a caller identification (ID) at the remote unit, the caller ID associated with the at least one of the call directed to the wireless communication device or the other message directed to the at least one of the wireless communication device or the wired communication device. In another aspect, the remote component can be configured to broadcast the alert from the remote unit via at least one of an audible or a visual means, or broadcast the other alert from the remote unit via the at least one of the audible or the visual means. For example, the at least one of the audible or the visual means can include at least one of a sound device or a light emitting diode (LED).

In other aspect(s), remote unit 1600 can perform the acts described above related to, e.g., FIGS. 1-14. Processor(s) 1610 can perform such acts within remote unit 1600 using, e.g., memory device(s) 1620, wireless transceiver(s) 1630, audio/visual output 1640, and input devices 1650. In an aspect (not shown), processor(s) 1610 can perform such acts within remote unit 1600 utilizing a wired interface (see above). In another aspect, remote unit 1600 can generate an alert via audio/visual output 1640, e.g., via sound devices, lights, etc. In yet another aspect, remote unit 1600 can facilitate receiving/accepting/responding to the call/message via audio/visual output 1640, e.g., via an LCD, video monitor, output devices 1940, etc. Moreover, remote unit 1600 can facilitate receiving/accepting/responding to the call/message via input devices 1650, e.g., touchpad, keypad, input devices 1936, etc.

Figure 17:
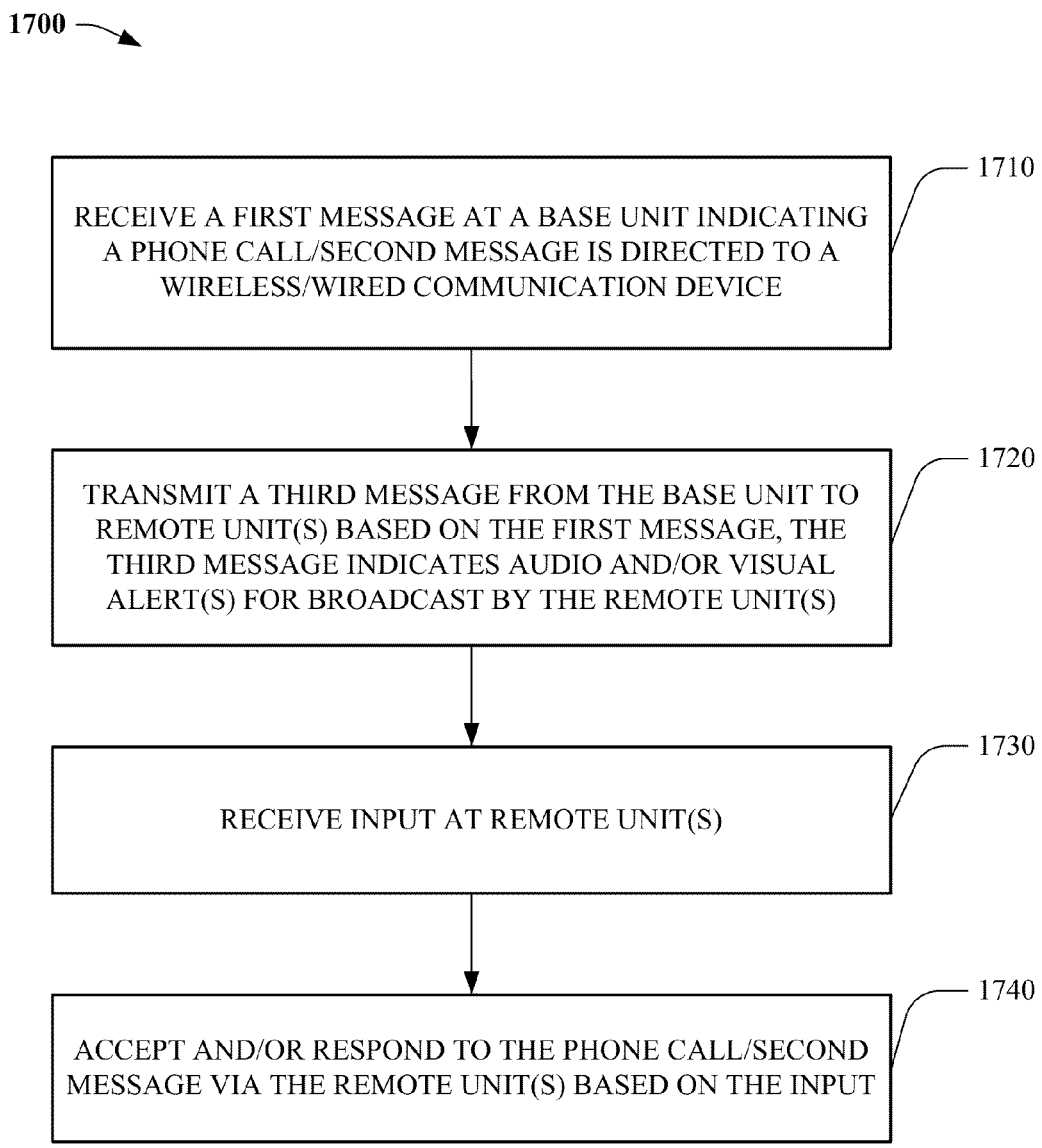
FIG. 17 illustrates a process performed by the remote unit, in accordance with an embodiment.

Now referring to FIG. 17, a process performed by remote component 1600 is illustrated, in accordance with an embodiment. At 1710, a first message can be received at a base unit indicating a phone call is directed to a wireless communication device or a second message is directed to at least one of the wireless communication device or a wired communication device. A third message indicating audio and/or visual alerts for broadcast by at least one remote unit can be transmitted at 1720 from the base unit to the at least one remote unit based on the first message. Further, an input an be received at the at least one remote unit at 1720. At 1740, the phone call or the second message can be accepted or responded to via the at least one remote unit based on the input.

Figure 18:
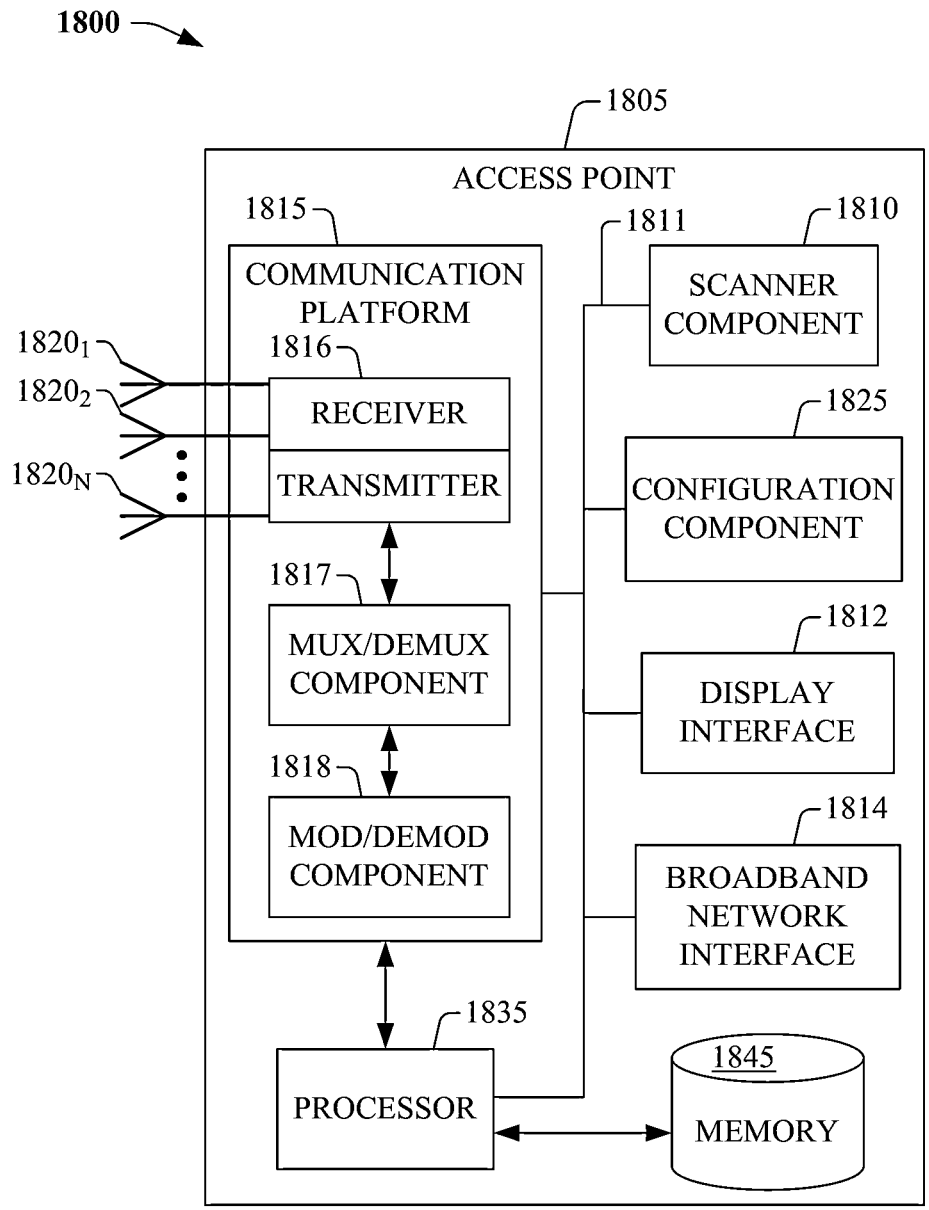
FIG. 18 illustrates a block diagram of an access point, in accordance with an embodiment.
Figure 19:
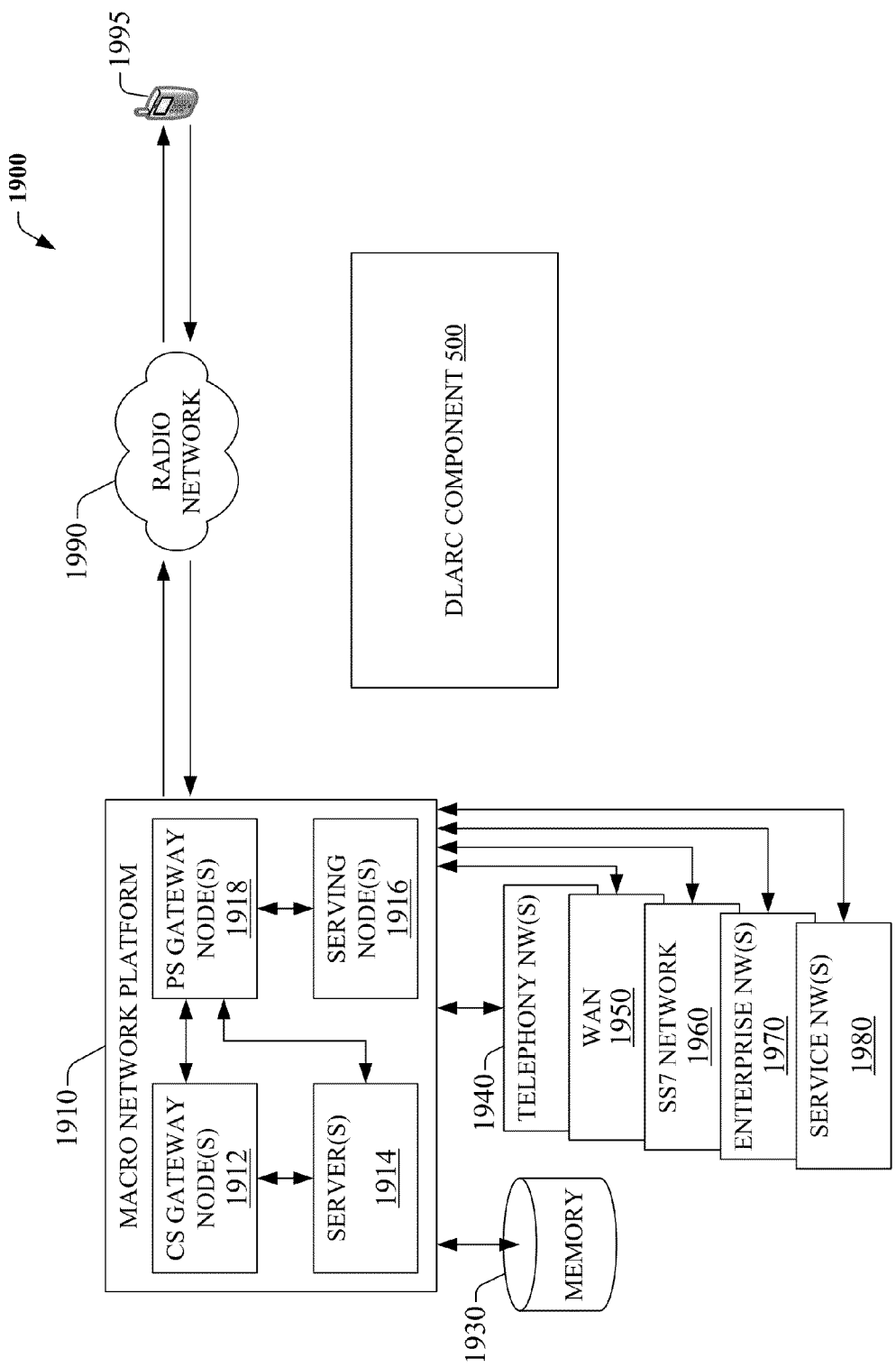
FIG. 19 illustrates a block diagram of a wireless network environment, in accordance with an embodiment.

To provide further context for various aspects of the disclosed subject matter, FIGS. 18 and 19 illustrate, respectively, a block diagram of an embodiment 1800 of an access point 1805, e.g., base station 210, wireless access point 330, wireless access point 440, which can enable and/or exploit features or aspects of the disclosed subject matter; and a wireless network environment 1900 including a macro network platform 1910, radio network 1990, and DLARC component 500 exploiting aspects of the subject innovation in accordance with various aspects of the subject specification.

In embodiment 1800, access point 1805 can receive and transmit signal(s) from and to wireless devices, e.g., wireless ports and routers, or the like, through a set of antennas $1820_1$-$1820_N$ (N is a positive integer). Antennas $1820_1$-$1820_N$ are a part of communication platform 1815, which comprises electronic components and associated circuitry that provide for processing and manipulation of received signal(s) and other signal(s) to be transmitted.

In an aspect, communication platform 1815 includes a receiver/transmitter 1816 that can convert analog signals to digital signals upon reception of the analog signals, and convert digital signals to analog signals upon transmission. In addition, receiver/transmitter 1816 can divide a single data stream into multiple, parallel data streams, or perform the reciprocal operation. Coupled to receiver/transmitter 1816 is a multiplexer/demultiplexer 1817 that facilitates manipulation of signals in time and frequency space. Electronic component 1817 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1817 can scramble and spread information, e.g., codes, according to substantially any code known in the art, e.g., Hadamard-Walsh codes, Baker codes, Kasami codes, polyphase codes, etc. A modulator/demodulator 1818 is also a part of communication platform 1815, and can modulate information according to multiple modulation techniques, such as frequency modulation, amplitude modulation, e.g., M-ary quadrature amplitude modulation (QAM), with M a positive integer); phase-shift keying (PSK); etc.

Access point 1805 also includes a processor 1835 configured to confer, at least in part, functionality to substantially any electronic component in access point 1805. In particular, processor 1835 can facilitate configuration of access point 1805 via, e.g., DLARC component 120, and one or more component therein. Additionally, access point 1805 can include display interface 1812, which can display functions that control functionality of access point 1805, or reveal operation conditions thereof. In addition, display interface 1812 can include a screen to convey information to an end user. In an aspect, display interface 1812 can be an LCD, a plasma panel, a monolithic thin-film based electrochromic display, and so on. Moreover, display interface 1812 can also include a component (e.g., speaker) that facilitates communication of aural indicia, which can also be employed in connection with messages that convey operational instructions to an end user. Display interface 1812 can also facilitate data entry e.g., through a linked keypad or via touch gestures, which can cause access point 1805 to receive external commands, e.g., restart operation.

Broadband network interface 1814 facilitates connection of access point 1805 to a service provider network (e.g., 255) (not shown in FIG. 18) via backhaul link(s) (e.g., 251) (not shown in FIG. 18), which enable incoming and outgoing data flow. Broadband network interface 1814 can be internal or external to access point 1805, and can utilize display interface 1812 for end-user interaction and status information delivery.

Processor 1835 can be functionally connected to communication platform 1815 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1835 can be functionally connected, via data, system, or address bus 1811, to display interface 1812 and broadband network interface 1814, to confer, at least in part, functionality to each of such components.

In access point 1805, memory 1845 can retain location and/or coverage area, e.g., macro sector, identifier(s); access list(s) that authorize access to wireless coverage through access point 1805; sector intelligence that can include ranking of coverage areas in the wireless environment of access point 1805, radio link quality and strength associated therewith, or the like. Memory 1845 also can store data structures, code instructions and program modules, system or device information, code sequences for scrambling, spreading and pilot transmission, access point configuration, and so on. Processor 1835 can be coupled, e.g., via a memory bus, to memory 1845 in order to store and retrieve information used to operate and/or confer functionality to the components, platform, and interface that reside within access point 1805.

With respect to FIG. 19, wireless communication environment 1900 includes DLARC component 500 and macro network platform 1910, which serves or facilitates communication with mobile device 1995 via radio network 1990. It should be appreciated that in cellular wireless technologies, e.g., 3GPP UMTS, HSPA, 3GPP LTE, 3GPP2 UMB, macro network platform 1910 is embodied in a core network. It is noted that radio network 1990 can include base station(s), base transceiver station(s), or access point(s), and associated electronic circuitry and deployment site(s), in addition to a wireless radio link operated in accordance with the base station(s). Accordingly, radio network 1990 can comprise various coverage cells like cell 205. In addition, it should be appreciated that although DLARC component 500 is illustrated in FIG. 19 as an entity distinct from other entities, elements, and/or components of wireless communication environment 1900, DLARC component 500, and/or elements/components thereof, can be located/included within one or more components/elements, e.g., hardware, software, etc., of wireless communication environment 1900, e.g., macro network platform 1910, radio network 1990, and/or mobile device 1995. Further, it should be appreciated that other embodiments of systems and/or components described herein, e.g., DLARC components 120, 230, 310, 430, and 500; DLARC systems 600, 700, and 800 can be included within one or more components/elements of wireless communication environment 1900 to perform aspects associated with such systems and/or components.

Generally, macro platform 1910 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 1910 includes CS gateway node(s) 1912 which can interface CS traffic received from legacy networks like telephony network(s) 1940, e.g., public switched telephone network (PSTN), or public land mobile network (PLMN), or a SS7 network 1960. Circuit switched gateway 1912 can authorize and authenticate traffic, e.g., voice, arising from such networks. Additionally, CS gateway 1912 can access mobility or roaming data generated through SS7 network 1960; for instance, mobility data stored in a VLR, which can reside in memory 1930. Moreover, CS gateway node(s) 1912 interfaces CS-based traffic and signaling and PS gateway node(s) 1918. As an example, in a 3GPP UMTS network, PS gateway node(s) 1918 can be embodied in gateway GPRS support node(s) (GGSN).

In addition to receiving and processing CS-switched traffic and signaling, PS gateway node(s) 1918 can authorize and authenticate PS-based data sessions with served, e.g., through macro RAN, wireless devices. Data sessions can include traffic exchange with networks external to the macro network platform 1910, like wide area network(s) (WANs) 1950; enterprise networks (NWs) 1970, e.g., enhanced 911, or service NW(s) 1980 like IP multimedia subsystem (IMS). It should be appreciated that local area network(s) (LANs), which may be a part of enterprise NW(s), can also be interfaced with macro network platform 1910 through PS gateway node(s) 1918. Packet-switched gateway node(s) 1918 generates packet data contexts when a data session is established. To that end, in an aspect, PS gateway node(s) 1918 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1914. It is to be noted that in 3GPP UMTS network(s), PS gateway node(s) 1918 (e.g., GGSN) and tunnel interface (e.g., TTG) comprise a packet data gateway (PDG).

Macro network platform 1910 also includes serving node(s) 1916 that can convey the various packetized flows of information, or data streams, received through PS gateway node(s) 1918. As an example, in a 3GPP UMTS network, serving node(s) can be embodied in serving GPRS support node(s) (SGSN).

As indicated above, server(s) 1914 in macro network platform 1910 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 1910. Data streams can be conveyed to PS gateway node(s) 1918 for authorization/authentication and initiation of a data session, and to serving node(s) 1916 for communication thereafter. Server(s) 1914 can also effect security, e.g., implement one or more firewalls, of macro network platform 1910 to ensure network's operation and data integrity in addition to authorization and authentication procedures that CS gateway node(s) 1912 and PS gateway node(s) 1918 can enact. Moreover, server(s) 1914 can provision services from external network(s), e.g., WAN 1950, or Global Positioning System (GPS) network(s), which can be a part of enterprise NW(s) 1980. It is to be noted that server(s) 1914 can include one or more processors configured to confer at least in part the functionality of macro network platform 1910. To that end, the one or more processors can execute code instructions stored in memory 1930, for example.

In example wireless environment 1900, memory 1930 stores information related to operation of macro network platform 1910. Information can include business data associated with subscribers; market plans and strategies, e.g., promotional campaigns, business partnerships; operational data for mobile devices served through macro network platform; service and privacy policies; end-user service logs for law enforcement; and so forth. Memory 1930 can also store information from at least one of telephony network(s) 1940, WAN 1950, SS7 network 1960, enterprise NW(s) 1970, or service NW(s) 1980.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory devices 1520, memory devices 1620, memory 1845, memory 1930, non-volatile memory 2022 (see below), disk storage 2024 (see below), and memory storage 2046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 20:
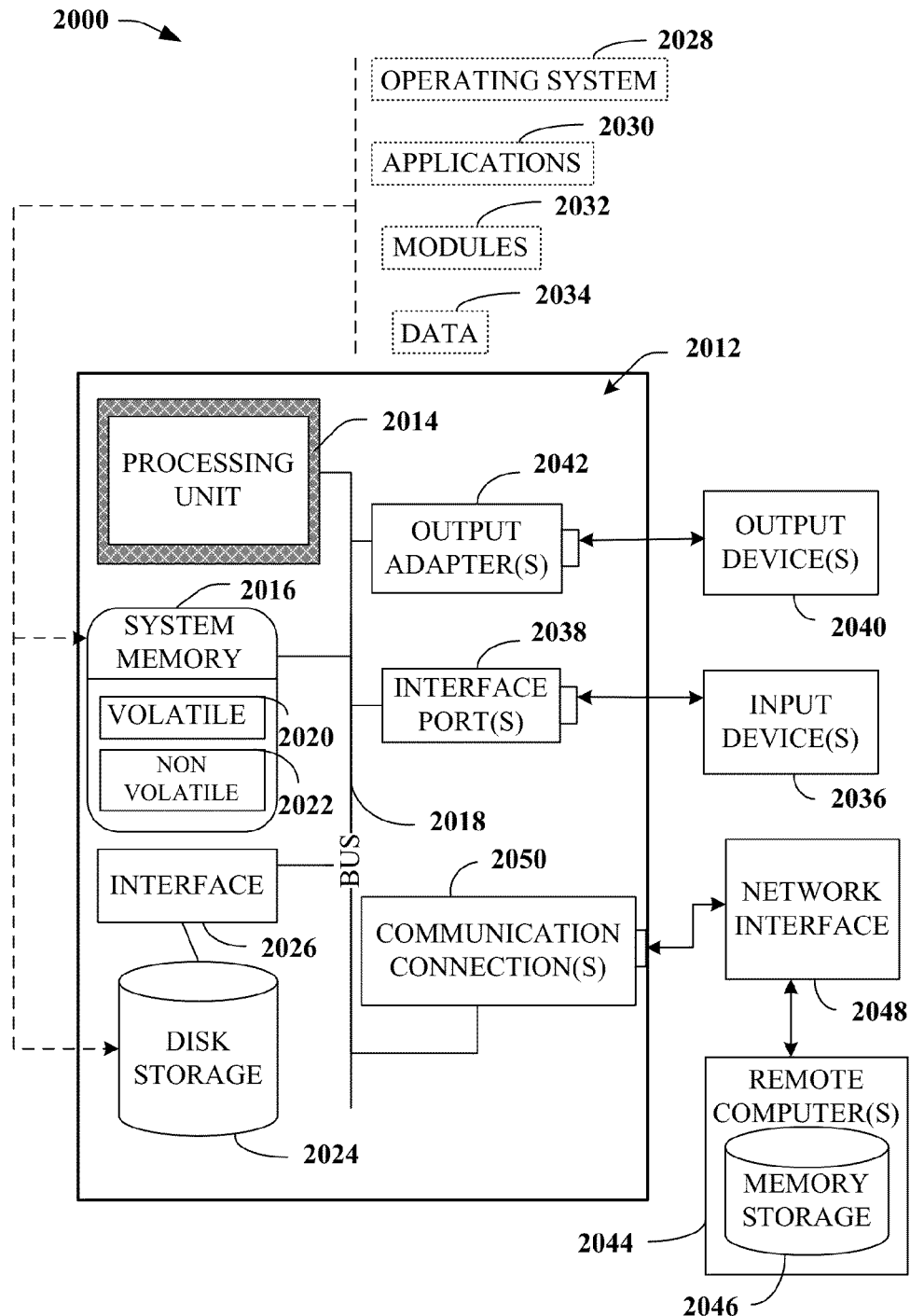
FIG. 20 illustrates a block diagram of a computing system operable to execute the disclosed methods and apparatus, in accordance with an embodiment.

In order to provide a context for the various aspects of the disclosed subject matter, FIG. 20, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 20, a block diagram of a computing system 2000 operable to execute the disclosed systems and methods is illustrated, in accordance with an embodiment. Computer 2012 includes a processing unit 2014, a system memory 2016, and a system bus 2018. System bus 2018 couples system components including, but not limited to, system memory 2016 to processing unit 2014. Processing unit 2014 can be any of various available processors. Dual microprocessors and other multiprocessor architectures also can be employed as processing unit 2014.

System bus 2018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 2016 includes volatile memory 2020 and nonvolatile memory 2022. A basic input/output system (BIOS), containing routines to transfer information between elements within computer 2012, such as during start-up, can be stored in nonvolatile memory 2022. By way of illustration, and not limitation, nonvolatile memory 2022 can include ROM, PROM, EPROM, EEPROM, or flash memory. Volatile memory 2020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2012 also includes removable/non-removable, volatile/non-volatile computer storage media. FIG. 20 illustrates, for example, disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to system bus 2018, a removable or non-removable interface is typically used, such as interface 2026.

It is to be appreciated that FIG. 20 describes software that acts as an intermediary between users and computer resources described in suitable operating environment 2000. Such software includes an operating system 2028. Operating system 2028, which can be stored on disk storage 2024, acts to control and allocate resources of computer system 2012. System applications 2030 take advantage of the management of resources by operating system 2028 through program modules 2032 and program data 2034 stored either in system memory 2016 or on disk storage 2024. It is to be appreciated that the disclosed subject matter can be implemented with various operating systems or combinations of operating systems.

A user can enter commands or information, e.g., via interface component 830, into computer 2011 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2014 through system bus 2018 via interface port(s) 2038. Interface port(s) 2038 include, for example, a serial port, a parallel port, a game port, and a universal serial bus (USB). Output device(s) 2040 use some of the same type of ports as input device(s) 2036.

Thus, for example, a USB port can be used to provide input to computer 2012 and to output information from computer 2012 to an output device 2040. Output adapter 2042 is provided to illustrate that there are some output devices 2040 like monitors, speakers, and printers, among other output devices 2040, which use special adapters. Output adapters 2042 include, by way of illustration and not limitation, video and sound cards that provide means of connection between output device 2040 and system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. Remote computer(s) 2044 can be a personal computer, a server, a router, a network PC, a workstation, a microprocessor based appliance, a peer device, or other common network node and the like, and typically includes many or all of the elements described relative to computer 2012.

For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refer(s) to hardware/software employed to connect network interface 2048 to bus 2018. While communication connection 2050 is shown for illustrative clarity inside computer 2012, it can also be external to computer 2012. The hardware/software for connection to network interface 2048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
receiving, from a network device of a service provider network, a signal that indicates a communication is being directed to a wireless communication device located in a first communication coverage area associated with a base station device that is associated with the service provider network, wherein the first communication coverage area is a macro coverage area served by the base station device and the network device; and
in response to the signal, distributing an alert to a remote device to facilitate broadcast of the alert, by the remote device, to a second communication coverage area that is outside of the first communication coverage area to facilitate notification of the communication being directed to the wireless communication device.

2. The system of claim 1, wherein the second communication coverage area is served by a base component of the system and the remote device.

3. The system of claim 1, wherein the operations further comprise:
receiving input information from a subscriber identity associated with the wireless communication device; and
managing a subscriber account associated with the subscriber identity based on the input information.

4. The system of claim 3, wherein the input information comprises alert customization information, and the operations further comprise:
configuring a customized alert associated with the subscriber identity based on the alert customization information, wherein the alert comprises the customized alert.

5. The system of claim 1, wherein the distributing the alert to the remote device further comprises distributing the alert to the remote device via a wireless interface.

6. The system of claim 1, wherein the distributing the alert to the remote device further comprises distributing the alert to the remote device via a wired interface.

7. The system of claim 1, wherein the communication comprises a voice call.

8. The system of claim 1, wherein the communication comprises data.

9. A method, comprising:
receiving, by a system comprising a processor, an alert distributed by a base device based on a communication directed to a mobile device, wherein the base device receives, via a network device of a service provider network, a signal that indicates the communication is being directed to the mobile device, and wherein the mobile device is determined not to be operating in a communication coverage area associated with a base station device associated with the service provider network, wherein the communication coverage area is a macro coverage area served by the base station device and the network device; and
in response to receiving the alert, transmitting, by the system, the alert to facilitate providing a notification of the communication being directed to the mobile device.

10. The method of claim 9, wherein the mobile device is determined not to be operating in the communication coverage area associated with the base station device due to the mobile device being in an off state.

11. The method of claim 9, wherein the mobile device is determined not to be operating in the communication coverage area associated with the base station device due to the mobile device being determined not to be located in the communication coverage area.

12. The method of claim 9, further comprising:
receiving, by the system, acceptance information from a user identity associated with the mobile device; and
in response to receiving the acceptance information, transmitting, by the system, the communication via an interface to the user identity.

13. The method of claim 9, further comprising:
in response to receiving input information from a user identity associated with the mobile device, transmitting, by the system, the input information to the base device to facilitate configuring a user account associated with the user identity.

14. The method of claim 9, wherein the communication comprises a voice call.

15. The method of claim 9, wherein the communication comprises a data message.

16. The method of claim 9, further comprising:
displaying, by the system, sender identification data associated with the communication, wherein the sender identification data identifies the sender identity that initiated the communication.

17. A non-transitory computer-readable medium storing instructions that, in response to execution, cause a system comprising a processor to perform operations, comprising:
receiving, from a network device of a service provider network, a signal that indicates a message is being directed to a wireless device, wherein the wireless device is not operating in a communication coverage area associated with a base station device that is associated with the service provider network, wherein the communication coverage area is a macro coverage area served by the base station device and the network device; and
in response to the signal, distributing an alert to a remote device to facilitate transmission of the alert, by the remote device, to facilitate providing a notification of the message being directed to the wireless device.

18. The non-transitory computer-readable medium of claim 17, wherein the wireless device is not operating in the communication coverage area associated with the base station device due to the wireless device being in an off state.

19. The non-transitory computer-readable medium of claim 17, wherein the wireless device is not operating in the communication coverage area associated with the base station device due to the wireless device not being located in the communication coverage area.

20. The method of claim 9, wherein the receiving the alert distributed by the base device further comprises receiving the alert in a second communication coverage area that is associated with the base device and the system.

* * * * *